US010856268B2

(12) United States Patent
Qin et al.

(10) Patent No.: US 10,856,268 B2
(45) Date of Patent: Dec. 1, 2020

(54) SUBFRAME CONFIGURATION METHOD AND RELATED DEVICE

(71) Applicant: HUAWEI TECHNOLOGIES CO., LTD., Shenzhen (CN)

(72) Inventors: Yi Qin, Shenzhen (CN); Hua Li, Shenzhen (CN); Zhongfeng Li, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 29 days.

(21) Appl. No.: 16/230,722

(22) Filed: Dec. 21, 2018

(65) Prior Publication Data
US 2019/0124643 A1 Apr. 25, 2019

Related U.S. Application Data

(63) Continuation of application No. PCT/CN2017/082388, filed on Apr. 28, 2017.

(30) Foreign Application Priority Data

Jun. 29, 2016 (CN) .......................... 2016 1 0498961

(51) Int. Cl.
*H04W 72/04* (2009.01)
*H04L 27/26* (2006.01)
(Continued)

(52) U.S. Cl.
CPC ......... *H04W 72/0406* (2013.01); *H04L 5/005* (2013.01); *H04L 5/0048* (2013.01);
(Continued)

(58) Field of Classification Search
CPC ......... H04W 72/0406; H04W 72/0453; H04W 72/042; H04W 72/0446; H04L 27/26;
(Continued)

(56) References Cited

U.S. PATENT DOCUMENTS

2012/0082124 A1 4/2012 Kwon et al.
2019/0037483 A1* 1/2019 Li ....................... H04W 72/042

FOREIGN PATENT DOCUMENTS

CN 101795145 A 8/2010
CN 102932797 A 2/2013
(Continued)

OTHER PUBLICATIONS

3GPP TS 36.213 V13.1.1(Mar. 2016), 3rd Generation Partnership Project;Technical Specification Group Radio Access Network;Evolved Universal Terrestrial Radio Access (E-UTRA);Physical layer procedures(Release 13), Mar. 2016. total 361 pages.
(Continued)

*Primary Examiner* — Kiet Tang
(74) *Attorney, Agent, or Firm* — Fish & Richardson P.C.

(57) ABSTRACT

Embodiments of the present disclosure includes example subframe configuration methods and related devices. One example method includes configuring, by a network-side device, a target subframe, where the target subframe includes at least one sounding reference signal (SRS) symbol used to send an SRS signal. The network-side device can then send first configuration signaling to a terminal device, where the first configuration signaling includes a resource configuration of the target subframe or an SRS configuration of the target subframe.

15 Claims, 7 Drawing Sheets

(51) Int. Cl.
    *H04L 25/02* (2006.01)
    *H04L 5/00* (2006.01)
    *H04L 5/14* (2006.01)
(52) U.S. Cl.
    CPC .......... *H04L 5/0051* (2013.01); *H04L 5/0094* (2013.01); *H04L 25/02* (2013.01); *H04L 27/26* (2013.01); *H04L 27/2605* (2013.01); *H04W 72/0453* (2013.01); *H04L 5/0016* (2013.01); *H04L 5/14* (2013.01)
(58) Field of Classification Search
    CPC ....... H04L 25/02; H04L 5/005; H04L 5/0051; H04L 5/0094; H04L 5/0048; H04L 27/2605; H04L 5/0016; H04L 5/14; H04L 5/0053
    See application file for complete search history.

(56) References Cited

FOREIGN PATENT DOCUMENTS

| | | |
|---|---|---|
| CN | 103095442 A | 5/2013 |
| CN | 103096346 A | 5/2013 |
| CN | 105634710 A | 6/2016 |
| EP | 2806581 A1 | 11/2014 |
| EP | 3236610 A1 | 10/2017 |
| WO | 2010140859 A2 | 12/2010 |
| WO | 2016099135 A1 | 6/2016 |

OTHER PUBLICATIONS

International Search Report and Written Opinion issued in International Application No. PCT/CN2017/082388 dated Jul. 19, 2017, 19 pages.
3GPP TS 36.211 V9.1.0 (Mar. 2010), "3rd Generation Partnership Project; Technical Specification Group Radio Access Network; Evolved Universal Terrestrial Radio Access (E-UTRA); Physical Channels and Modulation (Release 9)," Technical Specification, Mar. 2010, 86 pages.
Extended European Search Report issued in European Application No. 17818926.2 dated Jun. 3, 2019, 10 pages.
Office Action issued in Indian Application No. 201817050096 dated Jul. 28, 2020, 7 pages.

* cited by examiner

| 0 | 1 | 2 | 3 | 4 | 5 | 6 | 7 | 8 | 9 |
|---|---|---|---|---|---|---|---|---|---|
| D | S | U | U | D | D | S | U | U | D |

FIG. 3a

Downlink frame

| 0 | 1 | 2 | 3 | 4 | 5 | 6 | 7 | 8 | 9 |
|---|---|---|---|---|---|---|---|---|---|
| D | D | D | D | D | D | D | D | D | D |

Uplink frame

| 0 | 1 | 2 | 3 | 4 | 5 | 6 | 7 | 8 | 9 |
|---|---|---|---|---|---|---|---|---|---|
| U | U | U | U | U | U | U | U | U | U |

FIG. 3b

SUBFRAME CONFIGURATION METHOD AND RELATED DEVICE

CROSS-REFERENCE TO RELATED APPLICATIONS

This application is a continuation of International Application No. PCT/CN2017/082388, filed on Apr. 28, 2017, which claims priority to Chinese Patent Application No. 201610498961.9, filed on Jun. 29, 2016, The disclosures of the aforementioned applications are hereby incorporated by reference in their entireties.

TECHNICAL FIELD

Embodiments of the present invention relate to the field of communications technologies, and specifically, to a subframe configuration method and a related device.

BACKGROUND

With application and development of Long Term Evolution (Long Term Evolution, LTE for short) technologies, communications capacity requirements become increasingly high, and a multiple-input multiple-output (Multiple-Input Multiple-Output, MIMO for short) multiple-antenna technology is one of core technologies of LTE, and may effectively improve a network capacity in combination with an orthogonal frequency division multiplexing (Orthogonal Frequency Division Multiplexing, OFDM for short) technology. However, accompanied by introduction of a multiple-antenna technology, a quantity of channels between a user (User Equipment, UE for short) and a base station is also increased, and therefore more radio resources are required to perform channel measurement. Moreover, an increase in a quantity of users also further increases a quantity of channels in a network. Moreover, because of an increase in a speed of a passenger shuttle bus, a passenger train, or the like, a motion speed of a user is also increased correspondingly, causing a more rapid change in a channel. This requires that a network needs to complete channel measurement within a relatively short period of time. Based on the foregoing three aspects, a network has an increasingly high requirement (a quantity of channel measurement times within a unit time) for channel measurement currently, and therefore a capacity of sounding reference signals (SRS, Sounding Reference Signal) sent in uplink needs to be increased, to satisfy the foregoing channel measurement requirement.

In an existing LTE system, a user is allowed to send an SRS in a last symbol in an uplink subframe and an uplink part of a special subframe (The Uplink Part of The Special Subframe, UpPTS for short), and a base station performs channel measurement based on the SRS, to obtain an uplink channel. Distribution of the SRS in the uplink subframe and the uplink part of the special subframe is shown in FIG. 1. The uplink subframe is shown on the left in FIG. 1, and the SRS is set in the last symbol in the uplink subframe. The special subframe is shown on the right in FIG. 1, the special subframe includes the UpPTS, a guard period (Guard Period, GP for short), and a downlink part of the special subframe (The Downlink Part of The Special Subframe, DwPTS for short), and the SRS is set in the uplink part of the special subframe. Regardless of whether an SRS is set in the last symbol in the uplink subframe or an SRS is set in the uplink part of the special subframe, during SRS sending, the user sends one SRS at an interval of one subcarrier to form a comb structure instead of continuously sending SRSs in frequency domain. It can be learned based on the comb structure of the SRS that two users are allowed to transmit respective SRSs simultaneously, no interference exists, and an SRS capacity is increased. LTE further allows an SRS to have a maximum of eight cyclic shifts, SRSs having different cyclic shifts may also be sent simultaneously, and the SRS capacity may be further increased once again.

A cyclic shift on the comb structure is an SRS resource, and simultaneous sending of a maximum of only 16 SRS resources can be supported. In consideration of performance of a cyclic shift, only four cyclic shifts are usually used, in other words, eight SRS resources are sent simultaneously. However, this still cannot satisfy a channel measurement requirement.

SUMMARY

For the foregoing defect, embodiments of the present invention provide a subframe configuration method and a related device, to resolve a problem in the prior art that a channel measurement requirement cannot be satisfied and a network capacity is low, to increase the network capacity.

A first aspect of the embodiments of the present invention provides a subframe configuration method. The method may include:

configuring, by a network-side device, a target subframe, where the target subframe includes at least one sounding reference signal SRS symbol, and the SRS symbol is used to send an SRS signal; and sending, by the network-side device, first configuration signaling to a terminal device, where the first configuration signaling includes a resource configuration of the target subframe or an SRS configuration of the target subframe.

With reference to a first specific implementation of the first aspect of the embodiments of the present invention, the SRS configuration of the target subframe includes cell-specific SRS configuration information or user-specific SRS configuration information, the cell-specific SRS configuration information is used to identify the SRS symbol in the target subframe, and the user-specific SRS configuration information is used to identify an SRS resource that is allocated to the terminal device and that is in the SRS symbol in the target subframe, where the SRS resource includes a time domain resource, a frequency domain resource, or a code domain resource, the time domain resource includes one or more SRS symbols, and the code domain resource includes one or more SRS sequences.

With reference to the first aspect of the embodiments of the present invention and the first specific implementation of the first aspect, in a second specific implementation of the embodiments of the present invention, the method may include:

sending, by the network-side device, second configuration signaling to the terminal device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe.

With reference to the second specific implementation of the first aspect of the embodiments of the present invention, in a third specific implementation of the embodiments of the present invention, the method may include:

sending, by the network-side device, downlink control information DCI to the terminal device, where the DCI carries the second configuration signaling.

With reference to the first aspect of the embodiments of the present invention, the first specific implementation of the first aspect, the second specific implementation of the first aspect, and the third specific implementation of the first aspect, in a fourth specific implementation of the embodiments of the present invention, the method may include:

determining, by the network-side device based on the symbol occupied by the shared channel in the target subframe, a symbol occupied by a demodulation reference signal DMRS in the target subframe, and sending or receiving the DMRS based on the symbol occupied by the DMRS.

With reference to the first aspect of the embodiments of the present invention, the first specific implementation of the first aspect, the second specific implementation of the first aspect, and the third specific implementation of the first aspect, in a fifth specific implementation of the embodiments of the present invention, the method may include:

when at least one frequency division duplex FDD serving cell is configured for the terminal device, configuring, by the network-side device, the first configuration signaling for an uplink transmission frequency band and a downlink transmission frequency band of the FDD serving cell, and sending the first configuration signaling to the terminal device; or configuring, by the network-side device, the first configuration signaling for the FDD serving cell, and sending the first configuration signaling to the terminal device.

With reference to the second specific implementation of the first aspect of the embodiments of the present invention and the third specific implementation of the first aspect, in a sixth specific implementation of the embodiments of the present invention, the method may include:

when at least one FDD serving cell is configured for the terminal device, configuring, by the network-side device, the second configuration signaling for an uplink transmission frequency band and a downlink transmission frequency band of the FDD serving cell, and sending the second configuration signaling to the terminal device; or configuring, by the network-side device, the second configuration signaling for the FDD serving cell, and sending the second configuration signaling to the terminal device.

With reference to the fifth specific implementation of the first aspect of the embodiments of the present invention, in a seventh specific implementation of the embodiments of the present invention, the method may include:

when the at least one FDD serving cell is configured for the terminal device, determining, by the network-side device based on the first configuration signaling for the uplink transmission frequency band or the downlink transmission frequency band of the FDD serving cell, a symbol occupied by downlink transmission in the uplink transmission frequency band of the FDD serving cell; or determining, by the network-side device based on the first configuration signaling for the FDD serving cell, a symbol occupied by downlink transmission in the uplink transmission frequency band of the FDD serving cell.

With reference to the sixth specific implementation of the first aspect of the embodiments of the present invention, in an eighth specific implementation of the embodiments of the present invention, the method may include:

when the at least one FDD serving cell is configured for the terminal device, determining, by the network-side device based on the second configuration signaling for the uplink transmission frequency band or the downlink transmission frequency band of the FDD serving cell, a symbol occupied by downlink transmission in the uplink transmission frequency band of the FDD serving cell; or determining, by the network-side device based on the second configuration signaling for the FDD serving cell, a symbol occupied by downlink transmission in the uplink transmission frequency band of the FDD serving cell.

With reference to the first aspect of the embodiments of the present invention, the first specific implementation of the first aspect, the second specific implementation of the first aspect, and the third specific implementation of the first aspect, in a ninth specific implementation of the embodiments of the present invention, the method may include:

when at least two serving cells are configured for the terminal device, configuring, by the network-side device, the first configuration signaling for M serving cells of the at least two serving cells, and sending the first configuration signaling to the terminal device, where the serving cell is an FDD serving cell or a time division duplex TDD serving cell, and M is greater than or equal to 1 and less than or equal to a total quantity of the serving cells configured for the terminal device.

With reference to the second specific implementation of the first aspect of the embodiments of the present invention, in a tenth specific implementation of the embodiments of the present invention, the method may include:

when at least two serving cells are configured for the terminal device, configuring, by the network-side device, the second configuration signaling for M serving cells of the at least two serving cells, and sending the second configuration signaling to the terminal device, where the serving cell is an FDD serving cell or a TDD serving cell, and M is greater than or equal to 1 and less than or equal to a total quantity of the serving cells configured for the terminal device.

With reference to the ninth specific implementation of the first aspect of the embodiments of the present invention, in an eleventh specific implementation of the embodiments of the present invention, the method may include:

when the at least two serving cells are configured for the terminal device, determining, by the network-side device based on the first configuration signaling for the M serving cells of the at least two serving cells, a symbol occupied by downlink transmission in an uplink subframe of each serving cell, where M is greater than or equal to 1 and less than or equal to a total quantity of the serving cells configured for the terminal device.

With reference to the tenth specific implementation of the first aspect of the embodiments of the present invention, in a twelfth specific implementation of the embodiments of the present invention, the method may include:

when the at least two serving cells are configured for the terminal device, determining, by the network-side device based on the second configuration signaling for the M serving cells of the at least two serving cells, a symbol occupied by downlink transmission in an uplink subframe of each serving cell, where M is greater than or equal to 1 and less than or equal to a total quantity of the serving cells configured for the terminal device.

In the first aspect, the network-side device configures the target subframe, the at least one of symbols in the target subframe is the SRS symbol, the SRS symbol is mainly used to send the SRS signal, and then the network-side device sends the first configuration signaling to the terminal device, so that the terminal device obtains, through configuration based on the first configuration signaling, the target subframe including the at least one SRS symbol. It may be learned that, in the embodiments of the present invention, the network-side device may flexibly obtain, through configuration, the target subframe including the at least one SRS symbol, to satisfy a channel measurement requirement, increase a quantity of channel measurement times within a unit time, and satisfy a requirement of the terminal device for a network capacity.

A second aspect of the embodiments of the present invention provides a subframe configuration method. The method may include:

receiving, by a terminal device, first configuration signaling sent by a network-side device, where the first configuration signaling includes a resource configuration of a target subframe or an SRS configuration of the target subframe, the target subframe includes at least one SRS symbol, and the SRS symbol is used to send an SRS signal; and obtaining, by the terminal device based on the resource configuration of the target subframe in the first configuration signaling, the target subframe through configuration; or performing the SRS configuration of the target subframe based on the SRS configuration of the target subframe in the first configuration signaling.

With reference to a first specific implementation of the second aspect of the embodiments of the present invention, the SRS configuration of the target subframe includes cell-specific SRS configuration information or user-specific SRS configuration information, the cell-specific SRS configuration information is used to identify the SRS symbol in the target subframe, and the user-specific SRS configuration information is used to identify an SRS resource that is allocated to the terminal device and that is in the SRS symbol in the target subframe, where the SRS resource includes a time domain resource, a frequency domain resource, or a code domain resource, the time domain resource includes one or more SRS symbols, and the code domain resource includes one or more SRS sequences; and further, the performing the SRS configuration of the target subframe based on the SRS configuration of the target subframe in the first configuration signaling includes: determining, by the terminal device, the SRS symbol in the target subframe based on the cell-specific SRS configuration information; or determining, based on the user-specific SRS configuration information, the SRS resource that is allocated to the terminal device and that is in the SRS symbol in the target subframe.

With reference to the second aspect of the embodiments of the present invention and the first specific implementation of the second aspect, in a second specific implementation of the embodiments of the present invention, the method may include:

receiving, by the terminal device, second configuration signaling sent by the network-side device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe; and determining, by the terminal device according to the shared channel indication or the first symbol indication, the symbol occupied by the shared channel in the target subframe.

With reference to the second specific implementation of the second aspect of the embodiments of the present invention, in a third specific implementation of the embodiments of the present invention, the method may include:

receiving, by the terminal device, downlink control information DCI sent by the network-side device, where the DCI carries the second configuration signaling.

With reference to the second specific implementation of the second aspect of the embodiments of the present invention and the third specific implementation of the second aspect, in a fourth specific implementation of the embodiments of the present invention, the method may include:

determining, by the terminal device based on the symbol occupied by the shared channel, a symbol occupied by a demodulation reference signal DMRS in the target subframe, and sending or receiving the DMRS based on the symbol occupied by the DMRS.

With reference to the second aspect of the embodiments of the present invention, the first specific implementation of the second aspect, the second specific implementation of the second aspect, and the third specific implementation of the second aspect, in a fifth specific implementation of the embodiments of the present invention, the method may include:

when at least one frequency division duplex FDD serving cell is configured for the terminal device, receiving, by the terminal device, the first configuration signaling that is for an uplink transmission frequency band and a downlink transmission frequency band of the FDD serving cell and that is sent by the network-side device; or receiving, by the terminal device, the first configuration signaling that is for the FDD serving cell and that is sent by the network-side device; and after the receiving, by a terminal device, first configuration signaling sent by a network-side device, the method further includes: determining, by the terminal device based on the first configuration signaling for the uplink transmission frequency band and the downlink transmission frequency band of the FDD serving cell, a shared channel symbol location or a DMRS symbol location of the FDD serving cell; or determining, by the terminal device based on the first configuration signaling for the FDD serving cell, a shared channel symbol location or a DMRS symbol location of the FDD serving cell.

With reference to the second specific implementation of the second aspect of the embodiments of the present invention, in a sixth specific implementation of the embodiments of the present invention, the method may include:

when at least one FDD serving cell is configured for the terminal device, receiving, by the terminal device, the second configuration signaling that is for an uplink transmission frequency band and a downlink transmission frequency band of the FDD serving cell and that is sent by the network-side device; or receiving, by the terminal device, the second configuration signaling that is for the FDD serving cell and that is sent by the network-side device; and after the receiving, by a terminal device, second configuration signaling sent by a network-side device, the method further includes: determining, by the terminal device based on the second configuration signaling for the uplink transmission frequency band and the downlink transmission frequency band of the FDD serving cell, a shared channel symbol location or a DMRS symbol location of the FDD serving cell; or determining, by the terminal device based on the second configuration signaling for the FDD serving cell, a shared channel symbol location or a DMRS symbol location of the FDD serving cell.

With reference to the fifth specific implementation of the second aspect of the embodiments of the present invention, in a seventh specific implementation of the embodiments of the present invention, the method may include:

when the at least one FDD serving cell is configured for the terminal device, determining, by the terminal device based on the first configuration signaling for the uplink transmission frequency band and the downlink transmission frequency band of the FDD serving cell, a symbol occupied by downlink transmission in the uplink transmission frequency band of the FDD serving cell; or determining, by the terminal device based on the first configuration signaling for the FDD serving cell, a symbol occupied by downlink transmission in the uplink transmission frequency band of the FDD serving cell.

With reference to the sixth specific implementation of the second aspect of the embodiments of the present invention, in an eighth specific implementation of the embodiments of the present invention, the method may include:

when the at least one FDD serving cell is configured for the terminal device, determining, by the terminal device based on the second configuration signaling for the uplink transmission frequency band and the downlink transmission frequency band of the FDD serving cell, a symbol occupied by downlink transmission in the uplink transmission frequency band of the FDD serving cell; or determining, by the terminal device based on the second configuration signaling for the FDD serving cell, a symbol occupied by downlink transmission in the uplink transmission frequency band of the FDD serving cell.

With reference to the second aspect of the embodiments of the present invention, the first specific implementation of the second aspect, the second specific implementation of the second aspect, and the third specific implementation of the second aspect, in a ninth specific implementation of the embodiments of the present invention, the method may include:

when at least two serving cells are configured for the terminal device, receiving, by the terminal device, the first configuration signaling that is for M serving cells of the at least two serving cells and that is sent by the network-side device, where M is greater than or equal to 1 and less than or equal to a total quantity of the serving cells configured for the terminal device; and after the receiving, by a terminal device, first configuration signaling sent by a network-side device, the method further includes: determining, by the terminal device, a shared channel symbol location or a DMRS symbol location based on the first configuration signaling for the M serving cells of the at least two serving cells.

With reference to the second specific implementation of the second aspect of the embodiments of the present invention, in a tenth specific implementation of the embodiments of the present invention, the method may include:

when at least two serving cells are configured for the terminal device, receiving, by the terminal device, the second configuration signaling that is for M serving cells of the at least two serving cells and that is sent by the network-side device, where M is greater than or equal to 1 and less than or equal to a total quantity of the serving cells configured for the terminal device; and after the receiving, by a terminal device, second configuration signaling sent by a network-side device, the method further includes: determining, by the terminal device, a shared channel symbol location or a DMRS symbol location based on the second configuration signaling for the M serving cells of the at least two serving cells.

With reference to the ninth specific implementation of the second aspect of the embodiments of the present invention, in an eleventh specific implementation of the embodiments of the present invention, the method may include:

when the at least two serving cells are configured for the terminal device, determining, by the terminal device based on the first configuration signaling corresponding to the M serving cells of the at least two serving cells, a symbol occupied by downlink transmission in an uplink subframe of each serving cell, where M is greater than or equal to 1 and less than or equal to a total quantity of the serving cells configured for the terminal device.

With reference to the tenth specific implementation of the second aspect of the embodiments of the present invention, in a twelfth specific implementation of the embodiments of the present invention, the method may include:

when the at least two serving cells are configured for the terminal device, determining, by the terminal device based on the second configuration signaling corresponding to the M serving cells of the at least two serving cells, a symbol occupied by downlink transmission in an uplink subframe of each serving cell, where M is greater than or equal to 1 and less than or equal to a total quantity of the serving cells configured for the terminal device.

In the second aspect, the terminal device receives the first configuration signaling, determines the target subframe based on the resource configuration of the target subframe in the first configuration signaling, and then determines the SRS symbol in the target subframe based on the SRS configuration of the target subframe. It may be learned that in the embodiments of the present invention, based on the first configuration signaling sent by the network-side device, the target subframe including the at least one SRS symbol is obtained through configuration to transmit the SRS signal, thereby satisfying a channel measurement requirement, to increase a quantity of channel measurement times within a unit time, and satisfy a requirement of the terminal device for a network capacity.

A third aspect of the embodiments of the present invention provides a network-side device. The network-side device may include:

a configuration module, configured to configure a target subframe, where the target subframe includes at least one sounding reference signal SRS symbol, and the SRS symbol is used to send an SRS signal; and a communications module, configured to send first configuration signaling to a terminal device, where the first configuration signaling includes a resource configuration of the target subframe or an SRS configuration of the target subframe.

With reference to the third aspect of the embodiments of the present invention, in a first specific implementation of the embodiments of the present invention, the SRS configuration of the target subframe includes cell-specific SRS configuration information or user-specific SRS configuration information, the cell-specific SRS configuration information is used to identify the SRS symbol in the target subframe, and the user-specific SRS configuration information is used to identify an SRS resource that is allocated to the terminal device and that is in the SRS symbol in the target subframe, where the SRS resource includes a time domain resource, a frequency domain resource, or a code domain resource, the time domain resource includes one or more SRS symbols, and the code domain resource includes one or more SRS sequences.

With reference to the third aspect of the embodiments of the present invention and the first specific implementation of the third aspect, in a second specific implementation of the embodiments of the present invention, the communications module is further configured to: after the sending first configuration signaling to a terminal device, send second configuration signaling to the terminal device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe.

With reference to the second specific implementation of the third aspect of the embodiments of the present invention, in a third specific implementation of the embodiments of the present invention, the communications module is specifically configured to send downlink control information DCI to the terminal device, where the DCI carries the second configuration signaling.

With reference to the third aspect of the embodiments of the present invention, the first specific implementation of the third aspect, the second specific implementation of the third aspect, and the third specific implementation of the third aspect, in a fourth specific implementation of the embodiments of the present invention, the network-side device may include:

a first determining module, configured to determine, based on the symbol occupied by the shared channel in the target subframe, a symbol occupied by a demodulation reference signal DMRS in the target subframe, and send or receive the DMRS based on the symbol occupied by the DMRS.

With reference to the third aspect of the embodiments of the present invention, the first specific implementation of the third aspect, the second specific implementation of the third aspect, and the third specific implementation of the third aspect, in a fifth specific implementation of the embodiments of the present invention, the configuration module is specifically configured to: when at least one frequency division duplex FDD serving cell is configured for the terminal device, configure the first configuration signaling for an uplink transmission frequency band and a downlink transmission frequency band of the FDD serving cell; or configure the first configuration signaling for the FDD serving cell; and the communications module is further configured to send the first configuration signaling to the terminal device.

With reference to the second specific implementation of the third aspect of the embodiments of the present invention, in a sixth specific implementation of the embodiments of the present invention, the configuration module is specifically configured to: when at least one FDD serving cell is configured for the terminal device, configure the second configuration signaling for an uplink transmission frequency band and a downlink transmission frequency band of the FDD serving cell; or configure the second configuration signaling for the FDD serving cell; and the communications module is further configured to send the second configuration signaling to the terminal device.

With reference to the fifth specific implementation of the third aspect of the embodiments of the present invention, in a seventh specific implementation of the embodiments of the present invention, the network-side device may include:

a second determining module, configured to: when the at least one FDD serving cell is configured for the terminal device, determine, based on the first configuration signaling for the uplink transmission frequency band or the downlink transmission frequency band of the FDD serving cell, a symbol occupied by downlink transmission in the uplink transmission frequency band of the FDD serving cell; or determine, based on the first configuration signaling for the FDD serving cell, a symbol occupied by downlink transmission in the uplink transmission frequency band of the FDD serving cell.

With reference to the sixth specific implementation of the third aspect of the embodiments of the present invention, in an eighth specific implementation of the embodiments of the present invention, the network-side device may include:

a third determining module, configured to: when the at least one FDD serving cell is configured for the terminal device, determine, based on the second configuration signaling for the uplink transmission frequency band or the downlink transmission frequency band of the FDD serving cell, a symbol occupied by downlink transmission in the uplink transmission frequency band of the FDD serving cell; or determine, based on the second configuration signaling for the FDD serving cell, a symbol occupied by downlink transmission in the uplink transmission frequency band of the FDD serving cell.

With reference to the third aspect of the embodiments of the present invention, the first specific implementation of the third aspect, the second specific implementation of the third aspect, and the third specific implementation of the third aspect, in a ninth specific implementation of the embodiments of the present invention, the configuration module is specifically configured to: when at least two serving cells are configured for the terminal device, configure the first configuration signaling for M serving cells of the at least two serving cells, where M is greater than or equal to 1 and less than or equal to a total quantity of the serving cells configured for the terminal device; and the communications module is further configured to send the first configuration signaling to the terminal device, where the serving cell is an FDD serving cell or a time division duplex TDD serving cell With reference to the second specific implementation of the third aspect of the embodiments of the present invention, in a tenth specific implementation of the embodiments of the present invention, the configuration module is specifically configured to: when at least two serving cells are configured for the terminal device, configure the second configuration signaling for M serving cells of the at least two serving cells, where the serving cell is an FDD serving cell or a TDD serving cell, and M is greater than or equal to 1 and less than or equal to a total quantity of the serving cells configured for the terminal device; and the communications module is further configured to send the second configuration signaling to the terminal device.

With reference to the ninth specific implementation of the third aspect of the embodiments of the present invention, in an eleventh specific implementation of the embodiments of the present invention, the network-side device may include:

a fourth determining module, configured to: when the at least two serving cells are configured for the terminal device, determine, based on the first configuration signaling for the M serving cells of the at least two serving cells, a symbol occupied by downlink transmission in an uplink subframe of each serving cell, where M is greater than or equal to 1 and less than or equal to a total quantity of the serving cells configured for the terminal device.

With reference to the tenth specific implementation of the third aspect of the embodiments of the present invention, in a twelfth specific implementation of the embodiments of the present invention, the network-side device may include:

a fifth determining module, configured to: when the at least two serving cells are configured for the terminal device, determine, based on the second configuration signaling for the M serving cells of the at least two serving cells, a symbol occupied by downlink transmission in an uplink subframe of each serving cell, where M is greater than or equal to 1 and less than or equal to a total quantity of the serving cells configured for the terminal device.

A fourth aspect of the embodiments of the present invention provides a terminal device. The terminal device may include:

a communications module, configured to receive first configuration signaling sent by a network-side device, where the first configuration signaling includes a resource configuration of a target subframe or an SRS configuration of the target subframe, the target subframe includes at least one SRS symbol, and the SRS symbol is used to send an SRS signal; and a configuration module, configured to obtain, based on the resource configuration of the target subframe in the first configuration signaling, the target subframe through configuration, or perform the SRS configuration of the target subframe based on the SRS configuration of the target subframe in the first configuration signaling.

With reference to a first specific implementation of the second aspect of the embodiments of the present invention, the SRS configuration of the target subframe includes cell-specific SRS configuration information or user-specific SRS configuration information, the cell-specific SRS configuration information is used to identify the SRS symbol in the target subframe, and the user-specific SRS configuration information is used to identify an SRS resource that is allocated to the terminal device and that is in the SRS symbol in the target subframe, where the SRS resource includes a time domain resource, a frequency domain resource, or a code domain resource, the time domain resource includes one or more SRS symbols, and the code domain resource includes one or more SRS sequences; and the configuration module is specifically configured to determine the SRS symbol in the target subframe based on the cell-specific SRS configuration information; or determine, based on the user-specific SRS configuration information, the SRS resource that is allocated to the terminal device and that is in the SRS symbol in the target subframe.

With reference to the second aspect of the embodiments of the present invention and the first specific implementation of the second aspect, in a second specific implementation of the embodiments of the present invention, the communications module is further configured to receive second configuration signaling sent by the network-side device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe; and the configuration module is further configured to determine, according to the shared channel indication or the first symbol indication, the symbol occupied by the shared channel in the target subframe.

With reference to the second specific implementation of the second aspect of the embodiments of the present invention, in a third specific implementation of the embodiments of the present invention, the communications module is specifically configured to receive downlink control information DCI sent by the network-side device, where the DCI carries the second configuration signaling.

With reference to the second specific implementation of the second aspect of the embodiments of the present invention and the third specific implementation of the second aspect, in a fourth specific implementation of the embodiments of the present invention, the configuration module is further configured to determine, based on the symbol occupied by the shared channel, a symbol occupied by a demodulation reference signal DMRS in the target subframe, and send or receive the DMRS based on the symbol occupied by the DMRS.

With reference to the second aspect of the embodiments of the present invention, the first specific implementation of the second aspect, the second specific implementation of the second aspect, and the third specific implementation of the second aspect, in a fifth specific implementation of the embodiments of the present invention, the communications module is specifically configured to: when at least one frequency division duplex FDD serving cell is configured for the terminal device, receive the first configuration signaling that is for an uplink transmission frequency band and a downlink transmission frequency band of the FDD serving cell and that is sent by the network-side device; or receive the first configuration signaling that is for the FDD serving cell and that is sent by the network-side device; and the configuration module is specifically configured to determine, based on the first configuration signaling for the uplink transmission frequency band and the downlink transmission frequency band of the FDD serving cell, a shared channel symbol location or a DMRS symbol location of the FDD serving cell; or determine, based on the first configuration signaling for the FDD serving cell, a shared channel symbol location or a DMRS symbol location of the FDD serving cell.

With reference to the second specific implementation of the second aspect of the embodiments of the present invention, in a sixth specific implementation of the embodiments of the present invention, the communications module is further configured to: when at least one FDD serving cell is configured for the terminal device, receive the second configuration signaling that is for an uplink transmission frequency band and a downlink transmission frequency band of the FDD serving cell and that is sent by the network-side device; or receive the second configuration signaling that is for the FDD serving cell and that is sent by the network-side device; and the configuration module is further configured to determine, based on the second configuration signaling for the uplink transmission frequency band and the downlink transmission frequency band of the FDD serving cell, a shared channel symbol location or a DMRS symbol location of the FDD serving cell; or determine, based on the second configuration signaling for the FDD serving cell, a shared channel symbol location or a DMRS symbol location of the FDD serving cell.

With reference to the fifth specific implementation of the second aspect of the embodiments of the present invention, in a seventh specific implementation of the embodiments of the present invention, the configuration module is further configured to: when the at least one FDD serving cell is configured for the terminal device, determine, based on the first configuration signaling for the uplink transmission frequency band or the downlink transmission frequency band of the FDD serving cell, a symbol occupied by downlink transmission in the uplink transmission frequency band of the FDD serving cell; or determine, based on the first configuration signaling for the FDD serving cell, a symbol occupied by downlink transmission in the uplink transmission frequency band of the FDD serving cell.

With reference to the sixth specific implementation of the second aspect of the embodiments of the present invention, in an eighth specific implementation of the embodiments of the present invention, the configuration module is further configured to: when the at least one FDD serving cell is configured for the terminal device, determine, based on the second configuration signaling for the uplink transmission frequency band or the downlink transmission frequency band of the FDD serving cell, a symbol occupied by downlink transmission in the uplink transmission frequency band of the FDD serving cell; or determine, based on the second configuration signaling for the FDD serving cell, a symbol occupied by downlink transmission in the uplink transmission frequency band of the FDD serving cell.

With reference to the second aspect of the embodiments of the present invention, the first specific implementation of the second aspect, the second specific implementation of the second aspect, and the third specific implementation of the second aspect, in a ninth specific implementation of the embodiments of the present invention, the communications module is further configured to: when at least two serving cells are configured for the terminal device, receive the first configuration signaling that is for M serving cells of the at least two serving cells and that is sent by the network-side device, where M is greater than or equal to 1 and less than or equal to a total quantity of the serving cells configured for the terminal device; and the configuration module is further configured to determine a shared channel symbol location or a DMRS symbol location based on the first configuration signaling for the M serving cells of the at least two serving cells.

With reference to the second specific implementation of the second aspect, in a tenth specific implementation of the embodiments of the present invention, the communications module is further configured to: when at least two serving cells are configured for the terminal device, receive the second configuration signaling that is for M serving cells of the at least two serving cells and that is sent by the network-side device, where M is greater than or equal to 1 and less than or equal to a total quantity of the serving cells configured for the terminal device; and the configuration module is further configured to determine a shared channel symbol location or a DMRS symbol location based on the second configuration signaling for the M serving cells of the at least two serving cells.

With reference to the ninth specific implementation of the second aspect of the embodiments of the present invention, in an eleventh specific implementation of the embodiments of the present invention, the configuration module is further configured to: when the at least two serving cells are configured for the terminal device, determine, based on the first configuration signaling corresponding to the M serving cells of the at least two serving cells, a symbol occupied by downlink transmission in an uplink subframe of each serving cell, where M is greater than or equal to 1 and less than or equal to a total quantity of the serving cells configured for the terminal device.

With reference to the tenth specific implementation of the second aspect of the embodiments of the present invention, in a twelfth specific implementation of the embodiments of the present invention, the configuration module is further configured to: when the M serving cells of the at least two serving cells are configured for the terminal device, determine, based on the second configuration signaling corresponding to the serving cells, a symbol occupied by downlink transmission in an uplink subframe of each serving cell, where M is greater than or equal to 1 and less than or equal to a total quantity of the serving cells configured for the terminal device.

A fifth aspect of the embodiments of the present invention provides a subframe configuration system. The system may include:

the network-side device according to the third aspect, and the terminal device according to the fourth aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

FIG. 3a is a schematic structural diagram of a TDD frame according to some embodiments of the embodiments of the present invention;

FIG. 3b is a schematic structural diagram of an FDD frame according to some embodiments of the embodiments of the present invention;

DESCRIPTION OF EMBODIMENTS

Figure 1:
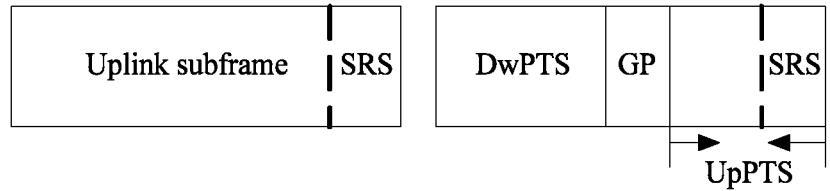
FIG. 1 is a schematic diagram of an SRS location in an uplink subframe in the prior art.

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the embodiments of the present invention.

The embodiments of the present invention provide a subframe configuration method and a related device, to flexibly configure a plurality of SRS symbols in a subframe to improve a quantity of channel measurement times within a unit time, to satisfy a requirement of a terminal device for a network capacity.

Technologies described in the embodiments of the present invention may be applied to various communications systems, for example, current 2G, 3G, 4G, and 5G communications systems and a next-generation communications system, for example, a Global System for Mobile Communications (Global System for Mobile Communications, GSM for short), a Code Division Multiple Access (Code Division Multiple Access, CDMA for short) system, a Time Division Multiple Access (Time Division Multiple Access, TDMA for short) system, a Wideband Code Division Multiple Access (Wideband Code Division Multiple Access Wireless, WCDMA) system, a Frequency Division Multiple Access (FDMA, Frequency Division Multiple Addressing) system, an Orthogonal Frequency-Division Multiple Access (Orthogonal Frequency-Division Multiple Access, OFDMA for short) system, a single-carrier FDMA (SC-FDMA) system, a general packet radio service (General Packet Radio Service, GPRS for short) system, a Long Term Evolution (Long Term Evolution, LTE for short) system, and other communications systems.

In the embodiments of the present invention, various aspects are described with reference to a terminal device or a network-side device.

The terminal device may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The network-side device (for example, an access point) may be a device in communication with a terminal via one or more sectors at an air interface in an access network. The network-side device may be configured to mutually convert a received over-the-air frame and an Internet Protocol (IP) packet and serve as a router between the terminal device and a rest portion of the access network. The rest portion of the access network may include an IP network. The network-side device may coordinate attribute management of the air interface. For example, the network-side device may be a base transceiver station (BTS, Base Transceiver Station) in GSM or CDMA, may be a NodeB (NodeB) in WCDMA, or may be an evolved NodeB (NodeB, eNB, or e-NodeB, evolutional NodeB) in LTE. This is not limited in this application.

In addition, the term "and/or" in the present invention describes only an association relationship for describing associated objects and represents that three relationships may exist. For example, A and/or B may represent the following three cases: Only A exists, both A and B exist, and only B exists.

In the embodiments of the present invention, a subframe (which may alternatively be a time unit, a scheduling unit, a transmission time interval, a time unit, or the like) is configured. Herein, the subframe is referred to as a target subframe. One symbol, some symbols, or all symbols in the target subframe are configured as SRS symbols, and the SRS symbol is represented as a symbol used to transmit an SRS signal.

Figure 2:
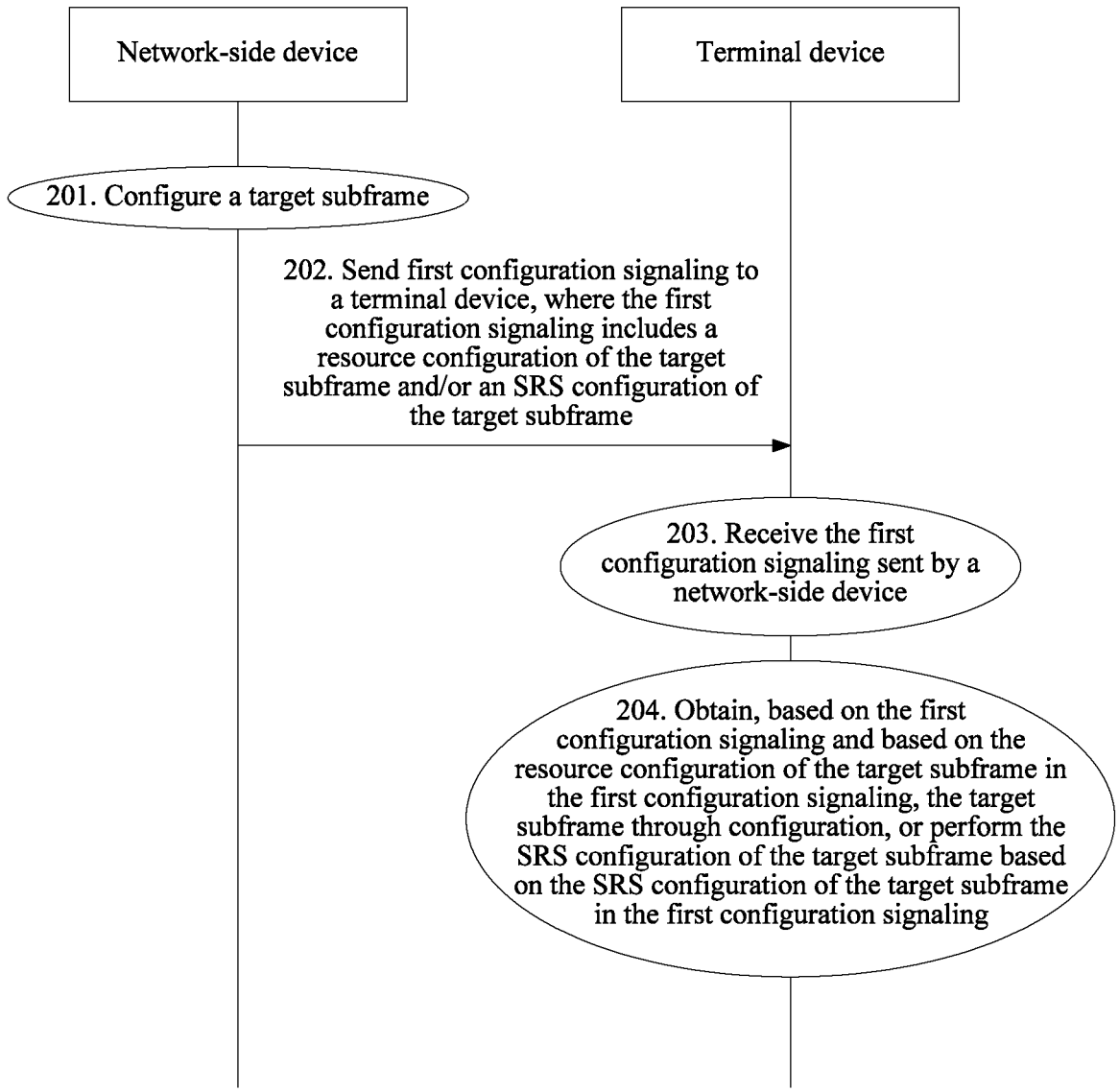
FIG. 2 is a schematic flowchart of a subframe configuration method according to some embodiments of the embodiments of the present invention.

Based on the foregoing description, the technical solutions of the embodiments of the present invention are described in detail below by using the specific embodiments. FIG. 2 is a schematic flowchart of a subframe configuration method according to some embodiments of the embodiments of the present invention. As shown in FIG. 2, the subframe configuration method may include the following steps.

201. A network-side device configures a target subframe, where the target subframe includes at least one SRS symbol, and the SRS symbol is used to send an SRS signal.

It may be understood that the target subframe includes several symbols, at least one symbol is configured as an SRS symbol used to send an SRS signal, and a quantity of SRS symbols in the target subframe is less than or equal to a maximum total symbol quantity of the target subframe.

202. The network-side device sends first configuration signaling to a terminal device, where the first configuration signaling includes a resource configuration of the target subframe or an SRS configuration of the target subframe.

The resource configuration of the target subframe includes a frame number of a frame to which the target subframe belongs and a subframe number of the target subframe. The SRS configuration of the target subframe includes cell-specific SRS configuration information or user-specific SRS configuration information. The cell-specific SRS configuration information is used to identify the SRS symbol in the target subframe, and the user-specific SRS configuration information is used to identify an SRS resource that is allocated to the terminal device and that is in the SRS symbol in the target subframe. The SRS resource includes a time domain resource, a frequency domain resource, or a code domain resource, the time domain resource includes one or more SRS symbols, and the code domain resource includes one or more SRS sequences.

It should be noted that, in some embodiments, the first configuration signaling includes only the resource configuration of the target subframe, and in this case, the SRS configuration of the target subframe is used as a default setting. After determining the target subframe based on the first configuration signaling, the terminal device determines the SRS configuration of the target subframe based on the default setting.

In some other embodiments, the first configuration signaling includes only the SRS configuration of the target subframe, and the resource configuration of the target subframe is used as a default setting, to be specific, the target subframe with the default setting is used to send the SRS signal. After receiving the first configuration signaling, the terminal device performs the SRS configuration on the target subframe with the default setting. If the SRS configuration includes only the cell-specific SRS configuration information, the SRS symbol used to send the SRS signal is determined from the target subframe with the default setting. If the SRS configuration includes only the user-specific SRS configuration information, a cell-specific SRS configuration is used as a default setting, an SRS symbol with the default setting is determined from the target subframe with the default setting, and then an SRS resource allocated to the terminal device is determined from the SRS symbol in the target subframe based on the SRS configuration in the first configuration signaling.

In some other embodiments, if the first configuration signaling includes both the resource configuration of the target subframe and the SRS configuration of the target subframe, after receiving the first configuration signaling, the terminal device first determines the target subframe based on the resource configuration of the target subframe, and then performs the SRS configuration on the target subframe. If the SRS configuration includes only the cell-specific SRS configuration information, only the SRS symbol in the target subframe needs to be determined, and then the terminal device obtains the SRS resource of the terminal device from the SRS symbol based on the default setting. If the SRS configuration includes only the user-specific SRS configuration information, the SRS symbol is determined from the determined target subframe based on the default setting, and then the SRS resource satisfying the user-specific SRS configuration information is obtained from the SRS symbol. If the SRS configuration includes both the cell-specific SRS configuration information and the user-specific SRS configuration information, the SRS symbol is first determined from the determined target subframe, and then the SRS resource is determined from the SRS symbol.

When the network-side device configures the target subframe for the terminal device, the following several configuration manners are specifically included.

Manner 1. When at least one FDD serving cell is configured for the terminal device, the network-side device may separately perform a configuration on an uplink transmission frequency band and a downlink transmission frequency band in the FDD serving cell of the terminal device. Specifically, a piece of first configuration signaling is configured for each of the uplink transmission frequency band and the downlink transmission frequency band, but content included in the first configuration signaling corresponding to the uplink transmission frequency band and content included in the first configuration signaling corresponding to the downlink transmission frequency band may be completely the same, partially the same, or completely different. Specifically, resource configurations of the target subframe or SRS configurations in the target subframe are completely the same as, partially the same, or completely different.

For example, in the uplink transmission frequency band, a second symbol and an eighth symbol in the target subframe are configured as SRS symbols, and in the downlink transmission frequency band, a fourth symbol in the target subframe is configured as an SRS symbol.

Based on the foregoing configuration manner, the network-side device can determine, based on the first configuration signaling for the uplink transmission frequency band and the downlink transmission frequency band of the FDD serving cell of the terminal device, a symbol occupied by downlink transmission in the uplink transmission frequency band of the FDD serving cell of the terminal device.

The uplink transmission frequency band related to this embodiment of the present invention may also be an uplink frequency band.

Alternatively, when at least one FDD serving cell is configured for the terminal device, the network-side device may further configure the first configuration signaling for only the FDD serving cell. That is, the network-side device configures the first configuration signaling for only the FDD serving cell. Target subframes obtained, through configuration, from an uplink transmission frequency band and a downlink transmission frequency band included in the FDD serving cell for which the first configuration signaling is configured are the same, but different target subframes may be configured for different FDD serving cells. This is specifically embodied on resource configurations of the target subframes or SRS configurations in the target subframes.

In the manner, the network-side device determines, based on the first configuration signaling for the FDD serving cell of the terminal device, a symbol occupied by the downlink transmission band in the uplink transmission frequency band in the FDD serving cell.

Manner 2. When at least two serving cells are configured for the terminal device, the network-side device configures the first configuration signaling for M serving cells of the at least two serving cells, where the serving cell in the manner 2 is an FDD serving cell or a TDD serving cell.

It may be understood that, when the at least two serving cells are configured for the terminal device, the network-side device configures the first configuration signaling for a serving cell, and may configure the first configuration signaling for M serving cells of the at least two serving cells. If the network-side device configures the first configuration signaling for the M serving cells, the first configuration signaling may be configured for each of the M serving cells, in other words, resource configurations of target subframes or SRS configurations in target subframes in first configuration instructions corresponding to the serving cells are completely different, completely the same, or partially the same.

Based on the manner 2, the network-side device determines, based on serving cells for which the first configuration signaling is configured and that are in the terminal device, a symbol occupied by downlink transmission in an uplink subframe of each serving cell.

203. The terminal device receives the first configuration signaling sent by the network-side device.

204. The terminal device obtains, based on the first configuration signaling and based on the resource configuration of the target subframe in the first configuration signaling, the target subframe through configuration, or performs the SRS configuration of the target subframe based on the SRS configuration of the target subframe in the first configuration signaling.

The terminal device first determines the target subframe based on the resource configuration of the target subframe in the first configuration signaling, and then further performs the SRS configuration of the target subframe.

Corresponding to content included in the first configuration signaling, if the first configuration signaling includes only the resource configuration of the target subframe, and in this case, the SRS configuration of the target subframe is used as a default setting, after determining the target subframe based on the first configuration signaling, the terminal device determines the SRS configuration of the target subframe based on the default setting.

If the first configuration signaling includes only the SRS configuration of the target subframe, and the resource configuration of the target subframe is used as a default setting, to be specific, a fixed subframe with the default setting is used to send the SRS signal, after receiving the first configuration signaling, the terminal device performs the SRS configuration on the fixed subframe with the default setting. If the SRS configuration includes only the cell-specific SRS configuration information, the SRS symbol used to send the SRS signal is determined from the fixed subframe with the default setting. If the SRS configuration includes only the user-specific SRS configuration information, a cell-specific SRS configuration is used as a default setting, an SRS symbol with the default setting is determined from the fixed subframe with the default setting, and then an SRS resource allocated to the terminal device is determined from the SRS symbol in the fixed subframe based on the SRS configuration in the first configuration signaling.

If the first configuration signaling includes both the resource configuration of the target subframe and the SRS configuration of the target subframe, after receiving the first configuration signaling, the terminal device first determines the target subframe based on the resource configuration of the target subframe, and then performs the SRS configuration on the target subframe. If the SRS configuration includes only the cell-specific SRS configuration information, only the SRS symbol in the target subframe needs to be determined, and then the terminal device obtains the SRS resource of the terminal device from the SRS symbol based on the default setting. If the SRS configuration includes only the user-specific SRS configuration information, the SRS symbol is determined from the determined target subframe based on the default setting, and then the SRS resource satisfying the user-specific SRS configuration information is obtained from the SRS symbol. If the SRS configuration includes both the cell-specific SRS configuration information and the user-specific SRS configuration information, the SRS symbol is first determined from the determined target subframe, and then the SRS resource is determined from the SRS symbol.

It may be learned that, in this embodiment of the present invention, the target subframe and the SRS symbol in the target subframe are freely configured, to increase a quantity of channel measurement times within a unit time, and satisfy a requirement of the terminal device for a network capacity.

In some embodiments, when at least one frequency division duplex FDD serving cell is configured for the terminal device, after the terminal device receives the first configuration signaling that is for the uplink transmission frequency band and the downlink transmission frequency band of the FDD serving cell and that is sent by the network-side device, the terminal device determines a shared channel symbol location or a DMRS symbol location of the FDD serving cell based on the first configuration signaling for the uplink transmission frequency band and the downlink transmission frequency band of the FDD serving cell; or after receiving the first configuration signaling that is for the FDD serving cell and that is sent by the network-side device, the terminal device determines a shared channel symbol location or a DMRS symbol location of the FDD serving cell based on the first configuration signaling for the FDD serving cell.

In some embodiments, when the at least one FDD serving cell is configured for the terminal device, the terminal device determines, based on the first configuration signaling for the uplink transmission frequency band or the downlink transmission frequency band of the FDD serving cell, a symbol occupied by downlink transmission in the uplink transmission frequency band of the FDD serving cell; or the terminal device determines, based on the first configuration signaling for the FDD serving cell, a symbol occupied by downlink transmission in the uplink transmission frequency band of the FDD serving cell.

In some embodiments, when at least two serving cells are configured for the terminal device, the terminal device receives the first configuration signaling that is for M serving cells of the at least two serving cells and that is sent by the network-side device, and the terminal device determines a shared channel symbol location or a DMRS symbol location based on the first configuration signaling for the M serving cells of the at least two serving cells.

In some embodiments, when the at least two serving cells are configured for the terminal device, the terminal device determines, based on the first configuration signaling corresponding to the M serving cells of the at least two serving cells, a symbol occupied by downlink transmission in an uplink subframe of each serving cell.

It may be further understood that, in some embodiments, the network-side device further sends second configuration signaling to the terminal device. The second configuration signaling includes a shared channel indication or a first symbol indication, the shared channel indication is used to indicate a symbol occupied by a shared channel in the target subframe, and the first symbol indication is used to indicate a symbol available for SRS transmission. Then, the terminal device may determine, according to the shared channel indication or the first symbol indication, the symbol occupied by the shared channel in the target subframe.

It should be noted that, the first symbol indication used herein is different from the SRS symbol in the foregoing described target subframe, the first symbol indication is only a first symbol indication for identifying a symbol reserved for SRS transmission, but is not an actual SRS symbol, and the symbol that may be used to transmit an SRS signal and that is identified in the first symbol indication is greater than or equal to the actual SRS symbol.

When the network-side device further configures the second configuration signaling for the terminal device, configuration manners of the second configuration signaling specifically include the following manners with reference to the configuration manners of the first configuration signaling.

Manner 1. When at least one FDD serving cell is configured for the terminal device, the network-side device may separately perform a configuration on an uplink transmission frequency band and a downlink transmission frequency band in the FDD serving cell of the terminal device. Specifically, a piece of second configuration signaling is configured for each of the uplink transmission frequency band and the downlink transmission frequency band, and each of the uplink transmission frequency band and the downlink transmission frequency band is corresponding to a shared channel indication or a first symbol indication in the second configuration signaling. This is determined based on the previous first configuration signaling for the uplink transmission frequency band and the downlink transmission frequency band.

Based on the foregoing configuration manner, the network-side device can determine, based on the second configuration signaling for the uplink transmission frequency band and the downlink transmission frequency band of the FDD serving cell of the terminal device, a symbol occupied by downlink transmission in the uplink transmission frequency band of the FDD serving cell of the terminal device. The terminal device may determine a shared channel symbol location or a DMRS symbol location of the FDD serving cell based on the second configuration signaling for the uplink transmission frequency band and the downlink transmission frequency band of the FDD serving cell. The terminal device may further determine, based on the second configuration signaling for the uplink transmission frequency band or the downlink transmission frequency band of the FDD serving cell, the symbol occupied by the downlink transmission in the uplink transmission frequency band of the FDD serving cell.

Alternatively, when at least one FDD serving cell is configured for the terminal device, the network-side device may further configure the second configuration signaling for only the FDD serving cell, that is, the network-side device configures the second configuration signaling for only the FDD serving cell.

In the manner, the network-side device determines, based on the second configuration signaling for the FDD serving cell of the terminal device, a symbol occupied by the downlink transmission band in the uplink transmission frequency band in the FDD serving cell. The terminal device determines a shared channel symbol location or a DMRS symbol location of the FDD serving cell based on the second configuration signaling for the FDD serving cell. Further, the terminal device may further determine, based on the second configuration signaling for the FDD serving cell, the symbol occupied by the downlink transmission in the uplink transmission frequency band of the FDD serving cell.

Manner 2. When at least two serving cells are configured for the terminal device, the network-side device configures the second configuration signaling for M serving cells of the at least two serving cells, where the serving cell in the manner 2 is an FDD serving cell or a TDD serving cell.

It may be understood that, when the at least two serving cells are configured for the terminal device, the network-side device configures the second configuration signaling for a serving cell, and may configure the second configuration signaling for M serving cells of the at least two serving cells. However, if the network-side device configures the second configuration signaling for more than two serving cells, the network-side device may configure the second configuration signaling for each of the more than two serving cells, in other words, resource configurations of target subframes or SRS configurations in target subframes in second configuration instructions corresponding to the serving cells are completely different, completely the same, or partially the same.

Based on the manner 2, the network-side device determines, based on serving cells for which the second configuration signaling is configured and that are in the terminal device, a symbol occupied by downlink transmission in an uplink subframe of each serving cell. The terminal device determines a shared channel symbol location or a DMRS symbol location based on the second configuration signaling for the M serving cells of the at least two serving cells. Further, the terminal device may further determine, based on the second configuration signaling corresponding to the serving cells, the symbol occupied by the downlink transmission in the uplink subframe of each serving cell.

The following describes in detail by using a TDD subframe and an FDD subframe as examples. A common TDD frame is shown in FIG. 3a, and includes an uplink subframe, a downlink subframe, and a special subframe between the uplink subframe and the downlink subframe. In FIG. 3a, U, D, and S are respectively used to indicate the uplink subframe, the downlink subframe, and the special subframe. First, in this embodiment of the present invention, some (one or more) uplink subframes shown in FIG. 3a are configured as target subframes. The target subframe is an uplink subframe in TDD. Therefore, in this embodiment of the present invention, the uplink subframe is also referred to as a special uplink subframe. Corresponding to FIG. 3a, a description is performed by using a special uplink subframe. For example, a subframe 3 in FIG. 3a may be configured as a special uplink subframe. After a configuration is performed, not only an SRS signal may be sent by using an uplink subframe and a special subframe, but also an SRS signal may be sent by using a special uplink subframe. A plurality of special uplink subframes may be configured, and a plurality of SRS symbols are configured in a special uplink subframe to transmit an SRS signal. Therefore, an SRS capacity may be increased by adding SRS symbols, thereby increasing a throughput.

It should be noted that, alternatively, some downlink subframes in a TDD frame may be configured as target subframes, and some symbols in a downlink subframe may be configured as SRS symbols, to adapt to some scenarios in which an SRS signal needs to be sent in downlink, for example, a 5G system or a next-generation communications system.

A common FDD frame is shown in FIG. 3b. The FDD frame includes a downlink frame in a downlink carrier and an uplink frame corresponding to an uplink carrier, the downlink frame is shown on the top of FIG. 3b, and the uplink frame is shown on the bottom of FIG. 3b. Some downlink subframes of the downlink frame are configured as target subframes in this embodiment of the present invention, and these downlink frames configured as the target subframes are referred to as special downlink subframes in this embodiment of the present invention. Corresponding to FIG. 3b, a description is performed by using the special downlink subframes. One symbol, some symbols, or all symbols in the special downlink subframes are used to send an SRS signal. Moreover, some uplink subframes of the uplink frame are configured as target subframes, and the uplink subframes configured as the target subframes in FDD are also referred to as special uplink subframes in this embodiment of the present invention. One symbol, some symbols, or all symbols in the special uplink subframes are used to send an SRS signal. For example, in FIG. 3b, downlink subframes 4 and 8 in the downlink frame are configured as special downlink subframes, and uplink subframes 2, 3 and 9 in the uplink frame are configured as special downlink subframes.

It may be understood that, because quantities of SRS symbols in target subframes are different, allocation of other resources is affected. In this embodiment of the present invention, the network-side device further sends a shared channel indication or an SRS indication to the terminal device. The shared channel indication or the SRS indication is sent by using third configuration signaling, and may be specifically added in downlink control information (Downlink Control Information, DCI for short). The shared channel indication is used to indicate a symbol occupied by a shared channel in the target subframe, and the SRS indication is used to indicate a quantity of symbols reserved for SRS symbols in the target subframe. Herein, the quantity of symbols may be a quantity of SRS symbols previously allocated in a first configuration instruction, or be greater than a quantity of SRS symbols in the first configuration signaling, mainly aiming to enable the terminal device to configure a demodulation reference signal (Demodulation Reference Signal, DMRS for short) according to the SRS indication.

The following describes by using a specific embodiment. First, a description is performed by using a TDD frame as an example. A base station configures some uplink subframes in a TDD frame as special uplink subframes, and configures some or all symbols in the special uplink subframes to be used to transmit an SRS resource, where the SRS resource includes a cell-specific SRS resource or a user-specific SRS resource. Therefore, a cell-specific SRS resource configuration or a user-specific SRS resource configuration needs to be completed. Additionally, the base station further configures a correspondence between a DMRS location of a special uplink subframe and a cell-specific SRS resource/user-specific physical uplink shared channel (Physical Uplink Shared Channel, PUSCH for short) available symbol, that is, a symbol occupied by a DMRS signal and a symbol occupied by a PUSCH signal in the special uplink subframe, and a correspondence between an interleaver design of resource mapping of control information in the special uplink subframe and the DMRS location.

Some symbols or all symbols in the special uplink subframe are used to transmit an SRS, nsrs_symbol is used to indicate a quantity of symbols for transmitting the SRS resource, where nsrs_symbol symbols used to transmit the SRS resource may be first nsrs_symbol symbols in the special uplink subframe or last nsrs_symbol symbols in the special uplink subframe, or the nsrs_symbol symbols are dispersedly distributed in the special uplink subframe. In this embodiment of the present invention, a description is performed by using as an example in which the nsrs_symbol symbols are the last nsrs_symbol symbols in the special uplink subframe.

A correspondence exists between a DMRS location of the special uplink subframe and a cell-specific SRS resource or user-specific PUSCH available symbol. In this embodiment of the present invention, an example in which a value of nsrs_symbol ranges from 0 to 4. If the DMRS location is corresponding to the cell-specific SRS resource, the correspondence is shown in Table 1.

TABLE 1

| Quantity of symbols occupied by a cell-specific SRS resource | Sequence number of a symbol in which a DMRS is located |
|---|---|
| 0 | 3, 10 |
| 1 | 3, 10 |
| 2 | 2, 8 |
| 3 | 2, 8 |
| 4 | 2, 7 |

It may be understood that, in a case of another quantity of symbols occupied by a cell-specific SRS resource, the DMRS location still needs to be correspondingly adjusted, and the adjusted DMRS location may be located in a symbol that is not configured to transmit an SRS resource. No adjustment example is provided herein. If the DMRS location is corresponding to the user-specific PUSCH available symbol, the correspondence is shown in Table 2.

TABLE 2

| PUSCH available symbol | Sequence number of a symbol in which a DMRS is located |
|---|---|
| Symbols No. 0 to No. 12 are available | 3, 10 |
| Symbols 11 and 12 are unavailable symbols, and symbols 0 to 10 are available symbols | 2, 8 |
| Other | 2, 7 |

It may be understood that, in a case of another quantity of symbols occupied by a cell-specific SRS resource, the DMRS location still needs to be correspondingly adjusted, and the adjusted DMRS location may be located in a symbol that is not configured to transmit an SRS resource. No adjustment example is provided herein. Moreover, a DMRS location of a user within a cell may alternatively be fixed, and does not change as a cell-specific SRS resource or a user-specific PUSCH available symbol changes. For example, sequence numbers of symbols in which a DMRS is located may be fixed to be symbols 2 and 8.

Figure 4A:
FIG. 4a is a schematic diagram of a resource configuration of a special uplink subframe according to some embodiments of the embodiments of the present invention.

Additionally, a correspondence exists between an interleaver design of resource mapping of control information in the special uplink subframe and the DMRS location. In this embodiment, when a DMRS occupies symbols 3 and 10, this is the prior art of a Long Term Evolution (Long Term Evolution, LTE for short) system, and details are not described herein. When a DMRS occupies symbols 2 and 8, an interleaver design of resource mapping of control information in a special uplink subframe is shown in FIG. 4a, where the symbol 2 and the symbol 8 are configured as symbols for transmitting the DMRS, last three symbols are configured as symbols for transmitting an SRS resource, resource elements identified with digits on the top of FIG. 4a are configured to transmit a channel quality indicator (Channels quality indication, CQI for short), resource elements that are identified with digits on the bottom of FIG. 4a and that are corresponding to symbols 0, 4, 6, and 10 are configured to transmit a rank indication (Rank Indication, RI for short), resource elements that are identified with digits on the bottom of FIG. 4a and that are corresponding to symbols 1, 3, 7, and 9 are configured to transmit acknowledgment information (ACK), and remaining resource elements are used to transmit data.

Figure 4B:
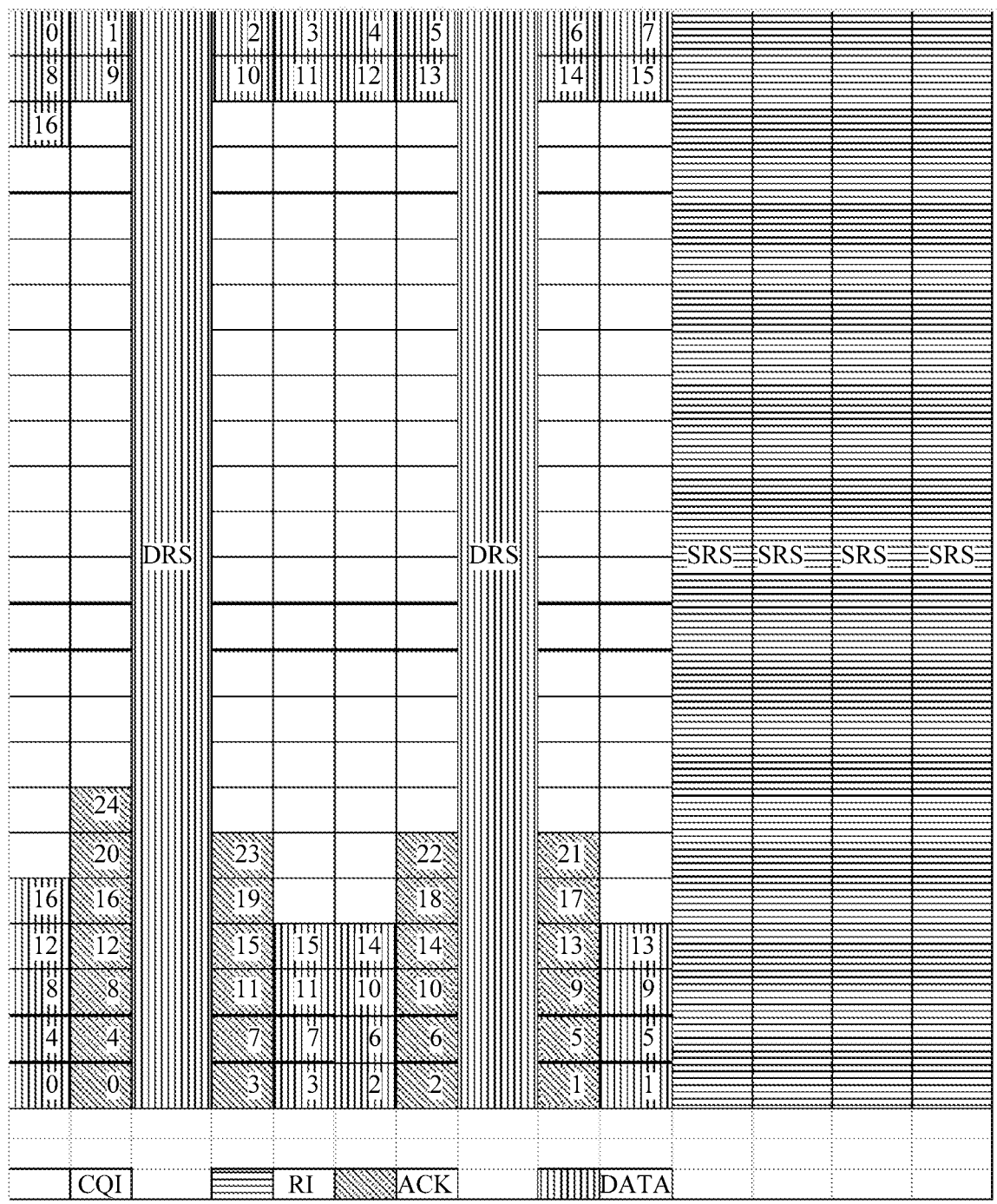
FIG. 4b is a schematic diagram of a resource configuration of a special uplink subframe according to some other embodiments of the embodiments of the present invention.

For another example, when a DMRS occupies symbols 2 and 7, an interleaver design of resource mapping of control information in a special uplink subframe is shown in FIG. 4b, where the DMRS occupies the symbols 2 and 7, last four symbols in the special uplink subframe are used to transmit an SRS resource, resource elements that are identified with digits on the bottom of FIG. 4b and that are corresponding to symbols 0, 4, 5, and 9 are used to transmit an RI, resource elements that are identified with digits on the bottom of FIG. 4b and that are corresponding to symbols 1, 3, 6, and 8 are used to transmit an ACK, resource elements that are identified with digits on the top and that are in the special uplink subframe are used to transmit a CQI, and remaining resource elements are used to transmit data.

Certainly, when the DMRS occupies other symbols, the interleaver design of the resource mapping of the control information in the special uplink subframe needs to be correspondingly adjusted, the control information after the adjustment is located on two sides or one side of a DMRS location, and may be located in a symbol not occupied by an SRS resource. No adjustment example is provided herein.

Additionally, the base station further needs to configure a symbol occupied by a PUSCH in the special uplink subframe.

In some of the embodiments of the present invention, when the base station configures a target subframe, the base station first needs to perform a cell-specific configuration, and configures a special uplink subframe in TDD in the following two manners:

Manner 1. The base station indicates a special uplink subframe by using a transmission offset (Transmission offset) in a cell-specific SRS subframe configuration (srs-SubframeConfig) in an existing LTE system. If a subframe indicated by the transmission offset is an uplink subframe in TDD, the uplink subframe is configured as a special uplink subframe, or if a subframe indicated by the transmission offset is a special subframe in TDD, the special subframe is originally used to transmit an SRS based on an existing protocol. For example, the base station needs to configure a subframe 2 and a subframe 7 in TDD as special uplink subframes and configure all special subframes in TDD to transmit an SRS, and the base station configures a cell-specific configuration higher-layer signaling srs-SubframeConfig value to be 0001. It can be learned according to a 3rd Generation Partnership Project (3rd Generation Partnership Project, 3GPP for short) TS that, a corresponding transmission offset is {1, 2}, and a cell-specific SRS period is 5 ms. To be specific, the subframes 2 and 7 are configured as special uplink subframes, and all special subframes are used to transmit an SRS.

Manner 2. New cell-specific higher-layer signaling (SpecialULSubframeFlags) is introduced, a quantity of bits is consistent with a quantity of offsets in a transmission offset in srs-SubframeConfig, and each bit and an offset in the transmission offset are in a one-to-one correspondence, enabling an SRS enhancement function. In this embodiment of the present invention, it is assumed that 1 indicates that SRS enhancement is enabled and 0 indicates that SRS enhancement is not enabled, and during actual application, no limitation is imposed to this correspondence. If a subframe indicated by the transmission offset is an uplink subframe in TDD, and a corresponding SpecialULSubframeFlags bit is 1, the subframe is a special uplink subframe; or if a subframe indicated by the transmission offset is a special subframe in TDD, according to an existing protocol, the subframe is a special subframe that may be used to transmit an SRS. For example, the base station needs to configure subframes 2 and 7 as special uplink subframes and configure all special subframes to transmit an SRS, and the base station configures a cell-specific configuration higher-layer signaling srs-SubframeConfig value to be 0101. It can be learned according to a 3GPP TS that, a corresponding transmission offset is {1, 2, 4}, a cell-specific SRS period is 5 ms, and SpecialULSubframeFlags is configured to be equal to 110. To be specific, the subframes 2 and 7 are configured as special uplink subframes, and all special subframes are used to transmit an SRS.

Figure 4C:
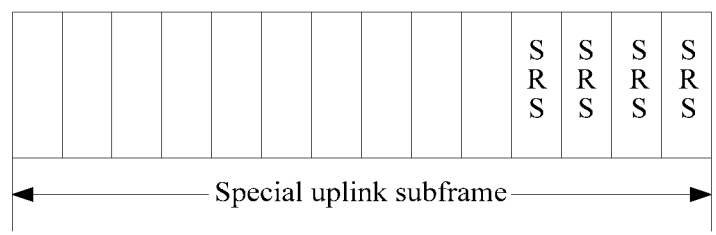
FIG. 4c is a schematic diagram of an SRS location of a special uplink subframe according to some embodiments of the embodiments of the present invention.

Then, the base station configures, on a basis of a cell, a quantity of symbols that are used to transmit an SRS and that are in the special uplink subframe. A specific manner may be adding new higher-layer signaling SpecialULSrsNum to system information (System Information, SIB for short), and the base station sends, to a user by using SpecialULSrsNum, a quantity m of cell-specific symbols that are used to transmit an SRS and that are in each special uplink subframe. In this embodiment of the present invention, an upper limit nsrs_symbol of a quantity of symbols that may be used to transmit an SRS and that are in a special uplink subframe is 4, the base station configures m to be equal to 4, and quantities of symbols that are used to transmit an SRS and that are in each special uplink subframe are the same. Therefore, SpecialULSrsNum occupies 3 bits, and SpecialULSrsNum=4. In this embodiment of the present invention, last four symbols in a special uplink subframe are configured to transmit an SRS. To be specific, when SpecialULSrsNum=4, symbols used to transmit an SRS are last, second last, third last, and fourth last symbols in a special uplink subframe, as shown in FIG. 4c.

Then, the base station performs a user-specific configuration, to configure an SRS resource for each user from the symbols that are used to transmit an SRS and that are in each special uplink subframe. An SRS resource configuration may be to add a UE-specific higher-layer signaling srs_symbol indication symbol offset (Tsrs_symbol,k), to indicate a symbol offset of an SRS resource on a kth TTI of l SRS symbols (lSRS) in LTE. For a trigger type 0 and a trigger type 1, for example, a quantity of symbols of UpPTS is u, and a user-specific SRS resource configuration includes the following cases.

If lSRS=0, that is, the base station configures the terminal device to send an SRS in an uplink subframe within a half TDD frame, k=1, and Tsrs_symbol,k represents u bits, indicating symbols in the uplink subframe on which a user sends an SRS. For example, when u=4, and Tsrs_symbol,k=0011, it indicates that the base station configures the terminal device to send an SRS on last two symbols in the uplink subframe.

If an lSRS value ranges from 1 to 6, that is, the base station configures a user to send an SRS in an uplink subframe and a special uplink subframe within a half TDD frame, k=1 or 2, Tsrs_symbol,1 is u bits, and Tsrs_symbol, 2 represents m bits, respectively indicating symbols in the uplink subframe on which the user sends an SRS and symbols in the special uplink subframe on which the user sends an SRS. For example, when u=4, m=4, Tsrs_symbol, 1=0011, and Tsrs_symbol,1=1100, it indicates that the base station configures the user to send an SRS on last two symbols in the uplink subframe and indicated third last and fourth last symbols in the special uplink subframe.

If an lSRS value ranges from 7 to 9, that is, the base station configures the user to send an SRS in two special uplink subframes within a half TDD frame, k=1 or 2, and Tsrs_symbol,k represents m bits, respectively indicating symbols in the two special uplink subframes on which the user sends an SRS. For example, when m=4, Tsrs_symbol, 1=0011, and Tsrs_symbol,1=1100, it indicates that the base station configures the user to send an SRS on indicated last two symbols in the first special uplink subframe and indicated third last and fourth last symbols in the second special uplink subframe.

If the lSRS is 10 or more than 10, that is, the base station configures the user to send an SRS in a special uplink subframe or an uplink subframe within a half TDD frame, k=1. When an SRS is sent in a special uplink subframe, Tsrs_symbol,1 represents m bits; or when an SRS is sent in an uplink subframe, Tsrs_symbol,1 represents u bits, to indicate symbols in the uplink subframe on which the user sends the SRS. For example, when an SRS is sent in a special uplink subframe, m=4, and Tsrs_symbol,1=0011, it indicates that the base station configures the user to send the SRS on indicated last two symbols in the special uplink subframe; or when the SRS is sent in an uplink subframe, u=4, and Tsrs_symbol,1=0011, it indicates that the base station configures the user to send the SRS on indicated last two symbols in the uplink subframe.

In some embodiments, if a quantity of available SRS symbols in a subframe indicated by the transmission offset in cell-specific srs-SubframeConfig is r, an srs configuration definition is changed to: for the trigger type 0 and the trigger type 1, ISRS={0 to 9} is expanded to ISRS={0 to 2r-1}, to indicate locations (bit map) of symbols that are used to transmit an SRS and that are in all SRS available resources. Other existing ISRS indexes are sequentially expanded, and definitions are not changed. Bits of a UE-specific srs configuration are r+1 bits. (To reduce signaling overheads, ISRS={0 to 9} may alternatively be expanded to a subset of ISRS={0 to 2r-1}.)

For example, when the transmission offset in srs-SubframeConfig indicates two special uplink subframes, and a quantity of available SRS symbols in each special uplink subframe is 4, r=8. When the base station needs to instruct the user to send an SRS on last two symbols in each special uplink subframe, configuration information ISRS=51 (that is, ISRS=00110011) is sent.

Further, to fully use an uplink resource that is currently not used for SRS transmission, the base station further performs user-specific PUSCH occupied symbol indication and enables user-specific PUSCH symbol adjustment. There are the following four indication methods in total:

A quantity of symbols occupied by a PUSCH (PUSCH symbol number) is increased in user-specific higher-layer signaling, indicating that the symbols occupied by the PUSCH include a symbol 0 to a symbol v, a value of v ranges from (13-m) to 13, and [log 2 (nsrs_symbol+1)] bits are required in total. Moreover, 1-bit user-specific higher-layer signaling PuschConfigFlag is added for a downlink control information (Downlink Control Information, DCI for short) format 0 (that is, Format 0) and a DCI Format 4, enabling the function. For example, when nsrs_symbol=4, and m=4, a relationship between a quantity of symbols (symbol number) occupied by a PUSCH and a PUSCH length may be shown in Table 3.

TABLE 3

| PUSCH symbol number | PUSCH length |
| --- | --- |
| 0 | 10 |
| 1 | 11 |
| 2 | 12 |
| 3 | 13 |
| 4 | 14 |

In this embodiment of the present invention, if the base station needs to configure a PUSCH length of a special uplink subframe of a user to be 12 symbols, the base station configures a quantity of symbols occupied by a PUSCH to be 2. If the base station enables the function, PuschConfigFlag=1; otherwise, PuschConfigFlag=0.

A quantity of symbols occupied by a PUSCH is increased in user-specific higher-layer signaling, indicating SRS symbols occupied by the PUSCH, and nsrs_symbol bits are required in total. Moreover, 1-bit signaling PuschConfigFlag is added for a DCI Format 0 and a DCI Format 4, enabling the function. For example, when nsrs_symbol=4, and m=4, in this embodiment of the present invention, the PUSCH occupied symbol quantity indicates, in a bitmap form, the SRS symbol occupied by the PUSCH, and during actual application, no limitation is imposed to the form of indication. In this embodiment of the present invention, if the base station needs to configure a PUSCH of a special uplink subframe of a user to occupy first two SRS symbols, the base station configures a quantity of symbols occupied by the PUSCH to be 1100. If the base station enables the function, PuschConfigFlag=1; otherwise, PuschConfigFlag=0.

The quantity of symbols occupied by the PUSCH is increased for the DCI Format 0 and the DCI Format 4, indicating that the symbols occupied by the PUSCH include a symbol 0 to a symbol v, and a value of v ranges from (13-m) to 13. If each piece of DCI indicates s special uplink subframes, [log 2 (nsrs_symbol+1)s] bits are required in total. Moreover, 1-bit user-specific higher-layer signaling PuschConfigFlag is added, enabling the function. For example, when nsrs_symbol=4, m=4, and s=1, a relationship between a quantity of symbols occupied by a PUSCH and a PUSCH length may be shown in Table 3.

In this embodiment of the present invention, if the base station needs to configure a PUSCH length of a special uplink subframe of a user to be 12 symbols, that is, there may be no SRS transmitted on symbols 10 and 11 in TDD in this case, and a PUSCH may be transmitted on the symbols 10 and 11, the base station configures the quantity of symbols occupied by the PUSCH to be 2. If the base station enables the function, PuschConfigFlag=1; otherwise, PuschConfigFlag=0.

The quantity of symbols occupied by the PUSCH is increased for the DCI Format 0 and the DCI Format 4, indicating the SRS symbols occupied by the PUSCH. If each piece of DCI indicates s special uplink subframes, snsrs_symbol bits are required in total. Moreover, 1-bit user-specific higher-layer signaling PuschConfigFlag is added, enabling the function. For example, when nsrs_symbol=4, m=4, and s=1, in this embodiment of the present invention, the quantity of symbols occupies by the PUSCH indicates, in a bitmap form, the SRS symbol occupied by the PUSCH, and during actual application, no limitation is imposed to the form of indication. In this embodiment of the present invention, if the base station needs to configure a PUSCH of a special uplink subframe of the user to occupy first two SRS symbols, that is, there may be no SRS transmitted on symbols 10 and 11 in TDD, and the PUSCH may be transmitted on the symbols 10 and 11, the base station configures the quantity of symbols occupied by the PUSCH to be 1100. If the base station enables the function, PuschConfigFlag=1; otherwise, PuschConfigFlag=0.

After the base station completes resource configuration transmission in TDD in the foregoing manner, the terminal device performs resource mapping and subframe sending based on a transmission resource, including: first calculating, by the terminal device based on a configuration of the base station, a time domain resource, a code domain resource, or a code domain resource of a sent SRS, mapping the SRS to an allocated SRS resource, and then sending the SRS symbol by symbol; and sending a PUSCH based on a PUSCH available symbol of the base station, and correspondingly adjusting a DMRS location, TBsize, and resource mapping of control information.

The terminal device needs to calculate a length of the SRS resource, and a prior-art calculation method is used. Details are not described herein. The terminal device obtains, based on the ISRS of the base station and $T_{srs\_symbol,k}$, a location of a symbol used to send an SRS within each period, where a calculation formula of $n_{SRS}$ is as follows:

$$n_{SRS} = \begin{cases} T_{srs\_symbol\_num}\left(N_{SP}n_f + (N_{SP}-1)\left\lfloor\frac{n_s}{10}\right\rfloor\right) + T_{count}, & T_{SRS} = 2 \text{ ms, } TDD \\ \lfloor T_{srs\_symbol\_num,1}(n_f \times 10 + \lfloor n_s/2 \rfloor)/T_{SRS}\rfloor, & \text{Other} \end{cases}$$

where $T_{srs\_symbol\_num,k}$ is a quantity of symbols in $T_{srs\_symbol,k}$, $T_{srs\_symbol\_num} = \Sigma T_{srs\_symbol\_num,k}$, and if a current symbol is a $T_{symbol\_count}{}^{th}$ symbol, in a TTI, sent by a $k_0{}^{th}$ SRS in a system-specific SRS period, $T_{count}$ is $$T_{count} = \begin{cases} T_{symbol\_count}, & k_0 = 1 \\ \sum_{k=1}^{k_0-1} T_{srs\_symbol\_num,k} + T_{symbol\_count}, & k_0 > 1 \end{cases}.$$

The user sends the PUSCH based on the PUSCH available symbol of the base station, and correspondingly adjusts the DMRS location, TBsize, and resource mapping of the control information. Specifically, the user adjusts a PUSCH length based on a PUSCH length configuration of the base station, and adjusts the TBsize based on the PUSCH length, where adjustment of the TBsize is shown in Table 4:

TABLE 4

| Quantity of symbols occupied by an SRS | $N_{PRB}{}^{new}$, an actually corresponding $N_{PRB}$ of LTE |
|---|---|
| 1 | $N_{PRB}{}^{new}$, no conversion required |
| 2 | 132 * $N_{PRB}{}^{new}/144$ |
| 3 | 120 * $N_{PRB}{}^{new}/144$ |
| 4 | 108 * $N_{PRB}{}^{new}/144$ |

If the TBsize obtained after conversion is still excessively large, a modulation and coding scheme (Modulation and Coding Scheme, MCS for short) order reduction method may be used. Moreover, the user adjusts control information of a DMRS and a PUSCH in a special uplink subframe based on a correspondence between the control information of the DMRS and the PUSCH in the special uplink subframe and configuration information of the base station.

It should be noted that, in this embodiment of the present invention, a same cell-specific SRS resource configuration may be used for all carriers in TDD, or different SRS cell-specific/user-specific configurations may be used for different carriers in TDD.

The following describes by using an FDD frame as an example. The base station configures some subframes of an FDD downlink frame as special downlink subframes and configures some subframes of an uplink frame as special uplink subframes. Some symbols or all symbols in the special downlink subframe are configured to transmit an SRS in uplink and configure a correspondence between a DMRS location in the special downlink subframe and a cell-specific SRS resource. Some symbols or all symbols in the special uplink subframe are configured to transmit an SRS in downlink, and configure a correspondence between a DMRS location in the special downlink subframe and a cell-specific SRS resource.

Some or all symbols in the special downlink subframe are used to transmit an SRS in uplink. It is assumed that a special downlink subframe has nsrs_symbol symbols used for SRS transmission, the nsrs_symbol symbols may be first nsrs_symbol symbols in the special downlink subframe, or last nsrs_symbol symbols in the special downlink subframe, or be dispersedly distributed in the special downlink subframe. In this embodiment of the present invention, a description is performed by using as an example in which the nsrs_symbol symbols are the last nsrs_symbol symbols in the special downlink subframe. Certainly, a specified guard period is required between a downlink symbol and an uplink symbol in a subframe. In this embodiment of the present invention, a guard period is two orthogonal frequency division multiplexing (Orthogonal Frequency Division Multiplexing, OFDM for short) symbols.

In addition, a correspondence exists between a DMRS location of the special downlink subframe and a cell-specific SRS resource or user-specific PDSCH available symbol. In this embodiment of the present invention, an example in which a value of nsrs_symbol is 4 is used. If a DMRS location is corresponding to a cell-specific SRS resource, a correspondence between the DMRS location and the cell-specific SRS resource is shown in Table 5.

TABLE 5

| Quantity of cell-specific SRS symbols | Sequence number of a symbol in which a DMRS is located |
|---|---|
| 0 | 5, 6, 12, 13 |
| 1 | 5, 6, 8, 9 |
| 2 | 5, 6, 8, 9 |
| 3 | 3, 4, 6, 7 |
| 4 | 3, 4, 6, 7 |

When the SRS symbol is another value, a DMRS still needs to be adjusted, the adjusted DMRS may be located in a symbol not occupied by an SRS. No adjustment example is provided herein.

Additionally, a symbol occupied by the PDSCH in the special downlink subframe is a symbol other than a control channel, an SRS, and a GP.

Similarly, a plurality of symbols in the special uplink subframe are configured to transmit an SRS. Details are the same as those of configuring the special uplink subframe in TDD, and are not described herein again.

A correspondence exists between a DMRS location of the special uplink subframe and a cell-specific SRS resource or user-specific PUSCH available symbol. In this embodiment of the present invention, if a description is performed by using an example in which a value of nsrs_symbol is 4, the correspondence between the DMRS location and the cell-specific SRS resource is shown in Table 6.

TABLE 6

| Quantity of cell-specific SRS symbols | Sequence number of a symbol in which a DMRS is located |
|---|---|
| 0 | 3, 9 |
| 1 | 3, 9 |
| 2 | 2, 7 |
| 3 | 2, 7 |
| 4 | 2, 6 |

When the SRS symbol is another value, a DMRS still needs to be adjusted, the adjusted DMRS may be located in a symbol not occupied by an SRS. No adjustment example is provided herein. If a DMRS location is corresponding to a user-specific PUSCH available symbol, a correspondence is shown in Table 7.

TABLE 7

| PUSCH available symbol | Sequence number of a symbol in which a DMRS is located |
|---|---|
| Symbols 0 to 12 are available | 3, 9 |
| Symbols 11 and 12 are unavailable symbols, and symbols 0 to 10 are available | 2, 7 |
| Others | 2, 6 |

When the SRS symbol is another value, a DMRS still needs to be adjusted, the adjusted DMRS may be located in a symbol not occupied by an SRS. No adjustment example is provided herein. Moreover, a DMRS location of a user within a cell may alternatively be fixed, and does not change as a cell-specific SRS resource or a user-specific PUSCH available symbol changes. For example, sequence numbers of symbols in which a DMRS is located may be fixed to be symbols 2 and 7. In consideration of an inter-frame switch guard time of uplink transmission of the user, the DMRS symbol herein is different from that in Embodiment 1. A specific DMRS location may be another configuration, but it needs to be ensured that a sum of a quantity of symbols occupied by a PUSCH and a quantity of cell-specific SRS symbols is less than or equal to a quantity of symbols in a subframe.

A correspondence between resource mapping of control information in a special uplink subframe and a DMRS location is similar to that in the configuration in TDD. No adjustment example is provided herein.

For an FDD configuration, there are a downlink frame and an uplink frame in FDD. Therefore, in this embodiment of the present invention, in addition to determining downlink subframes configured as special downlink subframes, the base station may configure k (k is an integer greater than or equal to 1) SRS configurations, including a quantity of SRS symbols in each special downlink subframe and an SRS resource allocated to each user in each SRS symbol.

Similarly, for a special uplink subframe, the base station configures k SRS configurations, including a quantity of SRS symbols in each special uplink subframe and an SRS resource allocated to each user in each quantity of SRS symbols.

Figure 5:
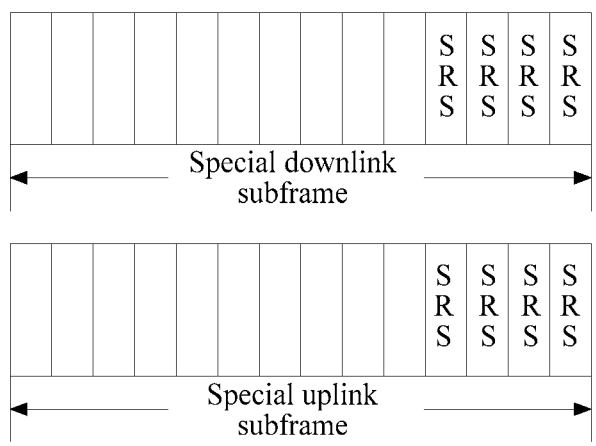
FIG. 5 is a schematic diagram of an SRS location of a special downlink/uplink subframe according to some embodiments of the embodiments of the present invention.

When k=1, which is a common configuration method in LTE, details are not described herein. When k>1, for one of the SRS configurations (which is referred to as a configuration i), the base station first configures a quantity of SRS symbols in a special downlink/uplink subframe, for example, adds new higher-layer signaling SpecialSrsNum{i} to a SIB, and the base station sends a quantity m of cell-specific SRS symbols in each special downlink/uplink subframe to a user by using SpecialSrsNum{i}. In this embodiment of the present invention, an upper limit nsrs_symbol of a quantity of available SRS symbols in a special downlink/uplink subframe is 4, the base station configures m to be equal to 4, and quantities of SRS symbols in all special downlink/uplink subframes are the same. Therefore, SpecialSrsNum{i} occupies 3 bits, and SpecialSrsNum{i}=4. In this embodiment of the present invention, the SRS symbols are located at the end of a special downlink/uplink subframe, that is, when SpecialSrsNum{i}=4, the SRS symbols are last, second last, third last, and fourth last symbols in the special downlink/uplink subframe. FIG. 5 is a schematic diagram of a location of an SRS symbol in a special downlink/uplink subframe according to an embodiment of the present invention. In FIG. 5, last four symbols in the special downlink/uplink subframe are used to transmit an SRS.

Further, the base station configures an SRS resource for each user in the special downlink/uplink subframe, an $i^{th}$ configuration is specifically: adding UE-specific higher-layer signaling srs_symbol {i} indication Tsrs_symbol, to indicate a symbol offset of an SRS on an ISRS TTI in existing LTE. It should be noted that the TTI herein is corresponding to a downlink frame instead of an uplink frame. Tsrs_symbol occupies m bits, and a symbol for transmitting an SRS is indicated in a bitmap form. For example, Tsrs_symbol,k=0011 indicates that the base station configures the user to send an SRS on last two symbols in a subframe.

The base station allocates one or more SRS configurations to each of a downlink frame and an uplink frame. Specifically, new higher-layer signaling SrsConfigDLSpecial, SrsConfigULNormal, and SrsConfigDLSpecial are added to a SIB, to respectively indicate SRS configurations used in a special downlink subframe, an uplink subframe, and a special uplink subframe. A quantity of bits occupied by each piece of signaling is $\lceil \log k \rceil \lceil \log k \rceil$.

The terminal device performs uplink transmission and downlink reception based on an SRS, including: calculating, by the terminal device based on a configuration of the base station, a time domain resource, a frequency domain resource, or a code domain resource of a sent SRS resource, and sending the SRS; receiving, by a user, a PDSCH based on a cell-specific SRS symbol corresponding to the SrsConfigDLSpecial, and correspondingly adjusting a DMRS location, TBsize, and resource mapping of control information; and adjusting, by the terminal device, a PUSCH length, a DMRS location of the PUSCH, the TBsize, a PUCCH format, and a DMRS location of a PUCCH based on the cell-specific SRS symbol corresponding to the SrsConfigDLSpecial.

The user calculates, based on the configuration of the base station, the time domain resource, the frequency domain resource, or the code domain resource of the sent SRS resource, and sends the SRS symbol by symbol. A prior-art calculation method is used for the calculation of the code domain resource in the SRS resource of the terminal device, and details are not described herein. However, the time domain resource and the frequency domain resource in the SRS resource are calculated by using the following calculation formula. First, nSRS is calculated as follows:

$$n_{SRS} = \lfloor T_{srs\_symbol\_num}(n_f \times 10 + \lfloor n_s/2 \rfloor)/T_{SRS} \rfloor$$

where $T_{srs\_symbol\_num}$ is a quantity of symbols in Tsrs_symbol.

The user receives the PDSCH based on the cell-specific SRS symbol corresponding to the SrsConfigDLSpecial, and correspondingly adjusts the DMRS location, the TBsize, and the resource mapping of the control information. For a specific DMRS, refer to Table 5. Details are not described herein again.

The user adjusts the PUSCH length, the DMRS location of the PUSCH, the TBsize, the PUCCH format, and the DMRS location of the PUCCH based on the cell-specific SRS symbol corresponding to the SrsConfigULSpecial. For a specific DMRS, refer to Table 6. Details are not described herein again.

Similarly, this embodiment of the present invention may be applicable to a plurality of FDD downlink/uplink frames, or may be extended to a plurality of TDD and FDD frames with reference to TDD. Different frames have different SRS cell-specific/user-specific configurations or a uniform SRS cell-specific/user-specific configuration, and the frames are independently/uniformly operated based on the solution of this embodiment.

Figure 6:
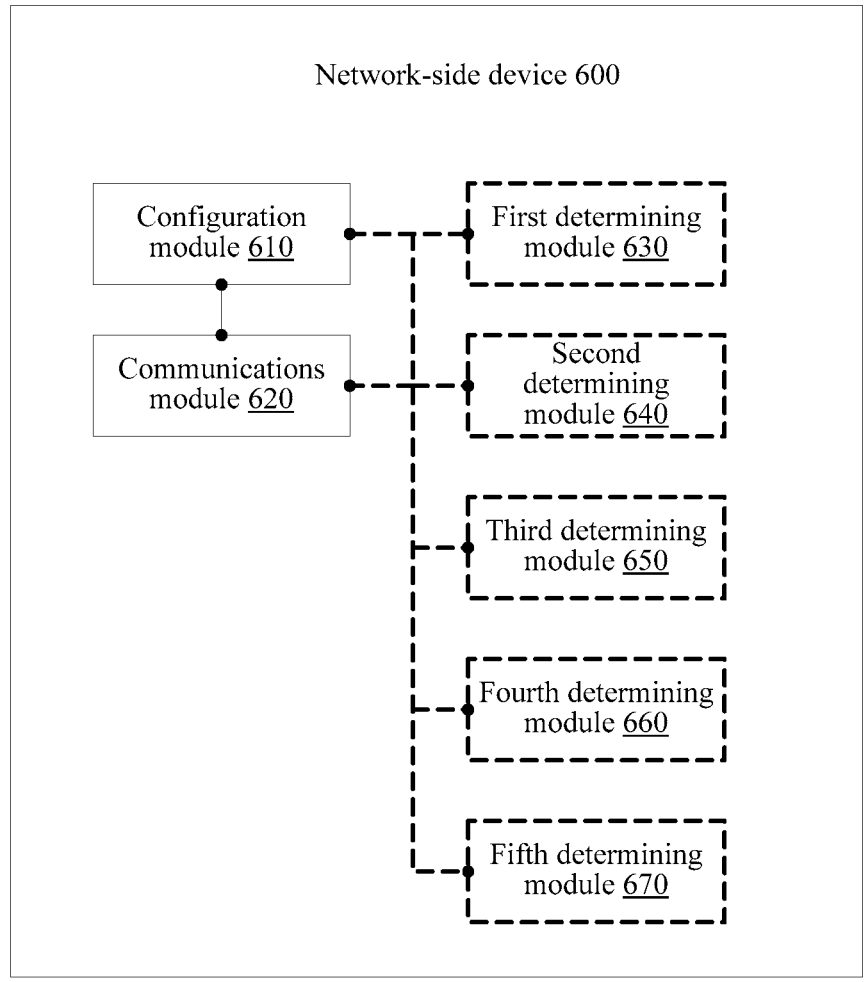
FIG. 6 is a schematic structural diagram of a network-side device according to an embodiment of the present invention.

FIG. 6 is a schematic structural diagram of a network-side device according to an embodiment of the present invention. As shown in FIG. 6, a network-side device 600 may include:

a configuration module 610, configured to configure a target subframe, where the target subframe includes at least one sounding reference signal SRS symbol, and the SRS symbol is used to send an SRS signal; and a communications module 620, configured to send first configuration signaling to a terminal device, where the first configuration signaling includes a resource configuration of the target subframe or an SRS configuration of the target subframe.

Optionally, in some implementable manners, the SRS configuration of the target subframe includes cell-specific SRS configuration information or user-specific SRS configuration information, the cell-specific SRS configuration information is used to identify the SRS symbol in the target subframe, and the user-specific SRS configuration information is used to identify an SRS resource that is allocated to the terminal device and that is in the SRS symbol in the target subframe, where the SRS resource includes a time domain resource, a frequency domain resource, or a code domain resource, the time domain resource includes one or more SRS symbols, and the code domain resource includes one or more SRS sequences.

Optionally, in some implementable manners, the communications module 620 is further configured to: after sending the first configuration signaling to the terminal device, send second configuration signaling to the terminal device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe.

Optionally, in some implementable manners, the communications module 620 is specifically configured to send downlink control information DCI to the terminal device, where the DCI carries the second configuration signaling.

Optionally, in some implementable manners, the network-side device 600 further includes:

a first determining module 630, configured to determine, based on the symbol occupied by the shared channel in the target subframe, a symbol occupied by a demodulation reference signal DMRS in the target subframe, and send or receive the DMRS based on the symbol occupied by the DMRS.

Optionally, in some implementable manners, the configuration module 610 is specifically configured to: when at least one frequency division duplex FDD serving cell is configured for the terminal device, configure the first configuration signaling for an uplink transmission frequency band and a downlink transmission frequency band of the FDD serving cell; or configure the first configuration signaling for the FDD serving cell; and the communications module 620 is further configured to send the first configuration signaling to the terminal device.

Optionally, in some implementable manners, the configuration module 610 is specifically configured to: when the at least one FDD serving cell is configured for the terminal device, configure the second configuration signaling for an uplink transmission frequency band and a downlink transmission frequency band of the FDD serving cell; or configure the second configuration signaling for the FDD serving cell; and the communications module 620 is further configured to send the second configuration signaling to the terminal device.

Optionally, in some implementable manners, the network-side device 600 further includes:

a second determining module 640, configured to: when the at least one FDD serving cell is configured for the terminal device, determine, based on the first configuration signaling for the uplink transmission frequency band or the downlink transmission frequency band of the FDD serving cell, a symbol occupied by downlink transmission in the uplink transmission frequency band of the FDD serving cell; or determine, based on the first configuration signaling for the FDD serving cell, a symbol occupied by downlink transmission in the uplink transmission frequency band of the FDD serving cell.

Optionally, in some implementable manners, the network-side device 600 further includes:

a third determining module 650, configured to: when at least one FDD serving cell is configured for the terminal device, determine, based on the second configuration signaling for the uplink transmission frequency band or the downlink transmission frequency band of the FDD serving cell, a symbol occupied by downlink transmission in the uplink transmission frequency band of the FDD serving cell; or determine, based on the second configuration signaling for the FDD serving cell, a symbol occupied by downlink transmission in the uplink transmission frequency band of the FDD serving cell.

Optionally, in some implementable manners, the configuration module 610 is specifically configured to: when at least two serving cells are configured for the terminal device, configure the first configuration signaling for M serving cells of the at least two serving cells; and the communications module 620 is further configured to send the first configuration signaling to the terminal device, where the serving cell is an FDD serving cell or a time division duplex TDD serving cell.

Optionally, in some implementable manners, the configuration module 610 is specifically configured to: when at least two serving cells are configured for the terminal device, configure the second configuration signaling for M serving cells of the at least two serving cells, where the serving cell is an FDD serving cell or a TDD serving cell; and the communications module 620 is further configured to send the second configuration signaling to the terminal device.

Optionally, in some implementable manners, the network-side device 600 further includes:

a fourth determining module 660, configured to: when the at least two serving cells are configured for the terminal device, determine, based on the first configuration signaling for the M serving cells of the at least two serving cells, a symbol occupied by downlink transmission in an uplink subframe of each serving cell.

Optionally, in some implementable manners, the network-side device 600 further includes:

a fifth determining module 670, configured to: when the at least two serving cells are configured for the terminal device, determine, based on the second configuration signaling for the M serving cells of the at least two serving cells, a symbol occupied by downlink transmission in an uplink subframe of each serving cell.

Figure 7:
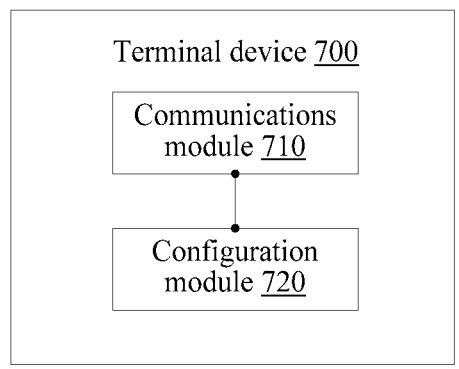
FIG. 7 is a schematic structural diagram of a terminal device according to an embodiment of the present invention.

FIG. 7 is a schematic structural diagram of a terminal device according to an embodiment of the present invention. As shown in FIG. 7, a terminal device 700 may include:

a communications module 710, configured to receive first configuration signaling sent by a network-side device, where the first configuration signaling includes a resource configuration of a target subframe or an SRS configuration of the target subframe, the target subframe includes at least one SRS symbol, and the SRS symbol is used to send an SRS signal; and a configuration module 720, configured to obtain, based on the resource configuration of the target subframe in the first configuration signaling, the target subframe through configuration, or perform the SRS configuration of the target subframe based on the SRS configuration of the target subframe in the first configuration signaling.

Optionally, in some implementable manners, the SRS configuration of the target subframe includes cell-specific SRS configuration information or user-specific SRS configuration information, the cell-specific SRS configuration information is used to identify the SRS symbol in the target subframe, and the user-specific SRS configuration information is used to identify an SRS resource that is allocated to the terminal device and that is in the SRS symbol in the target subframe, where the SRS resource includes a time domain resource, a frequency domain resource, or a code domain resource, the time domain resource includes one or more SRS symbols, and the code domain resource includes one or more SRS sequences; and the configuration module 720 is specifically configured to determine the SRS symbol in the target subframe based on the cell-specific SRS configuration information; or determine, based on the user-specific SRS configuration information, the SRS resource that is allocated to the terminal device and that is in the SRS symbol in the target subframe.

Optionally, in some implementable manners, the communications module 710 is further configured to receive second configuration signaling sent by the network-side device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe; and the configuration module 720 is further configured to determine, according to the shared channel indication or the first symbol indication, the symbol occupied by the shared channel in the target subframe.

Optionally, in some implementable manners, the communications module 710 is specifically configured to receive downlink control information DCI sent by the network-side device, where the DCI carries the second configuration signaling.

Optionally, in some implementable manners, the configuration module 720 is further configured to determine, based on the symbol occupied by the shared channel, a symbol occupied by a demodulation reference signal DMRS in the target subframe, and send or receive the DMRS based on the symbol occupied by the DMRS.

Optionally, in some implementable manners, the communications module 710 is specifically configured to: when at least one frequency division duplex FDD serving cell is configured for the terminal device, receive the first configuration signaling that is for an uplink transmission frequency band and a downlink transmission frequency band of the FDD serving cell and that is sent by the network-side device; or receive the first configuration signaling that is for the FDD serving cell and that is sent by the network-side device; and the configuration module 720 is specifically configured to determine, based on the first configuration signaling for the uplink transmission frequency band and the downlink transmission frequency band of the FDD serving cell, a shared channel symbol location or a DMRS symbol location of the FDD serving cell; or determine, based on the first configuration signaling for the FDD serving cell, a shared channel symbol location or a DMRS symbol location of the FDD serving cell.

Optionally, in some implementable manners, the communications module 710 is further configured to: when at least one FDD serving cell is configured for the terminal device, receive the second configuration signaling that is for an uplink transmission frequency band and a downlink transmission frequency band of the FDD serving cell and that is sent by the network-side device; or receive the second configuration signaling that is for the FDD serving cell and that is sent by the network-side device; and the configuration module 720 is further configured to determine, based on the second configuration signaling for the uplink transmission frequency band and the downlink transmission frequency band of the FDD serving cell, a shared channel symbol location or a DMRS symbol location of the FDD serving cell; or determine, based on the second configuration signaling for the FDD serving cell, a shared channel symbol location or a DMRS symbol location of the FDD serving cell.

Optionally, in some implementable manners, the configuration module 720 is further configured to: when the at least one FDD serving cell is configured for the terminal device, determine, based on the first configuration signaling for the uplink transmission frequency band or the downlink transmission frequency band of the FDD serving cell, a symbol occupied by downlink transmission in the uplink transmission frequency band of the FDD serving cell; or determine, based on the first configuration signaling for the FDD serving cell, a symbol occupied by downlink transmission in the uplink transmission frequency band of the FDD serving cell.

Optionally, in some implementable manners, the configuration module 720 is further configured to: when the at least one FDD serving cell is configured for the terminal device, determine, based on the second configuration signaling for the uplink transmission frequency band or the downlink transmission frequency band of the FDD serving cell, a symbol occupied by downlink transmission in the uplink transmission frequency band of the FDD serving cell; or determine, based on the second configuration signaling for the FDD serving cell, a symbol occupied by downlink transmission in the uplink transmission frequency band of the FDD serving cell.

Optionally, in some implementable manners, the communications module 710 is further configured to when at least two serving cells are configured for the terminal device, receive the first configuration signaling that is for M serving cells of the at least two serving cells and that is sent by the network-side device; and the configuration module 720 is further configured to determine a shared channel symbol location or a DMRS symbol location based on the first configuration signaling for the M serving cells of the at least two serving cells.

Optionally, in some implementable manners, the communications module 710 is further configured to when at least two serving cells are configured for the terminal device, receive the second configuration signaling that is for M serving cells of the at least two serving cells and that is sent by the network-side device; and the configuration module 720 is further configured to determine a shared channel symbol location or a DMRS symbol location based on the second configuration signaling for the M serving cells of the at least two serving cells.

Optionally, in some implementable manners, the configuration module 720 is further configured to: when the at least two serving cells are configured for the terminal device, determine, based on the first configuration signaling corresponding to the M serving cells of the at least two serving cells, a symbol occupied by downlink transmission in an uplink subframe of each serving cell.

Optionally, in some implementable manners, the configuration module 720 is further configured to: when the at least two serving cells are configured for the terminal device, determine, based on the second configuration signaling corresponding to the serving cells, a symbol occupied by downlink transmission in an uplink subframe of each serving cell.

Figure 8:
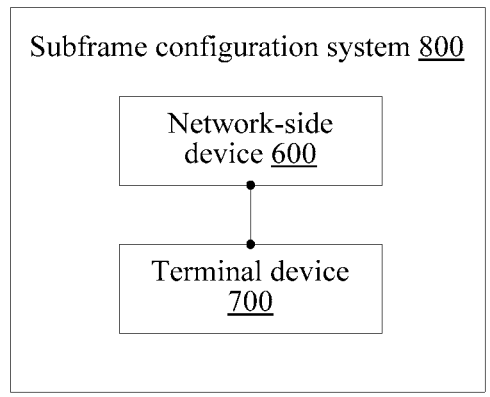
FIG. 8 is a schematic structural diagram of a subframe configuration system according to an embodiment of the present invention.

FIG. 8 is a schematic structural diagram of a subframe configuration system according to an embodiment of the present invention. As shown in FIG. 8, a subframe configuration system 800 may include:

a network-side device 600 and a terminal device 700.

For descriptions of the network-side device 600 and the terminal device 700, refer to the method embodiment and the apparatus embodiment. Details are not described herein.

Figure 9:
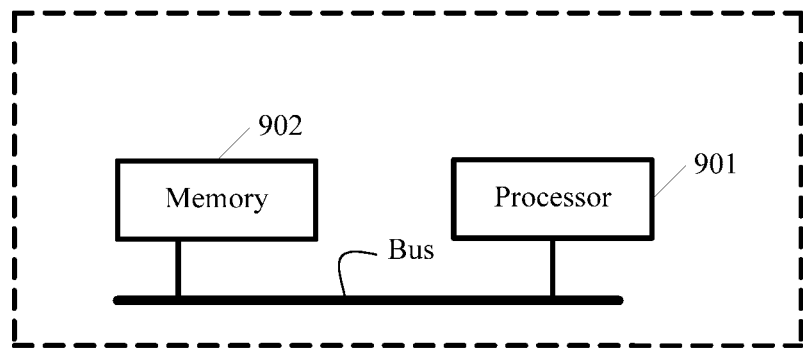
FIG. 9 is another schematic structural diagram of a network-side device according to an embodiment of the present invention.

FIG. 9 is another schematic structural diagram of a network-side device according to an embodiment of the present invention. The network-side device may include at least one processor 901 (for example, a CPU, Central Processing Unit), at least one network interface or another communications interface, a memory 902, and at least one communications bus that is configured to implement connection and communication between these apparatuses. The processor 901 is configured to execute an executable module stored in the memory, for example, a computer program. The memory 902 may include a high-speed random access memory (RAM, Random Access Memory), and may further include a non-volatile memory (non-volatile memory) such as at least one magnetic disk storage. A communication connection between a system gateway and at least one other network element is implemented by using the at least one network interface (which may be wired or wireless), and the Internet, a wide area network, a local area network, a metropolitan area network, and the like may be used.

As shown in FIG. 9, in some implementations, the memory 902 stores a program instruction, the program instruction may be executed by the processor 901, and the processor 901 specifically performs the following steps: configuring a target subframe, where the target subframe includes at least one sounding reference signal SRS symbol, and the SRS symbol is used to send an SRS signal; and sending first configuration signaling to a terminal device, where the first configuration signaling includes a resource configuration of the target subframe or an SRS configuration of the target subframe.

In some implementations, the processor 901 may further perform the following step: after sending the first configuration signaling to the terminal device, sending second configuration signaling to the terminal device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe.

In some implementations, the processor 901 may further perform the following step: sending downlink control information DCI to the terminal device, where the DCI carries the second configuration signaling.

In some implementations, the processor 901 may further perform the following step: determining, based on the symbol occupied by the shared channel in the target subframe, a symbol occupied by a demodulation reference signal DMRS in the target subframe, and sending or receiving the DMRS based on the symbol occupied by the DMRS.

In some implementations, the processor 901 may further perform the following steps: when at least one frequency division duplex FDD serving cell is configured for the terminal device, configuring the first configuration signaling for an uplink transmission frequency band and a downlink transmission frequency band of the FDD serving cell; or configuring the first configuration signaling for the FDD serving cell; and sending the first configuration signaling to the terminal device.

In some implementations, the processor 901 may further perform the following steps: when at least one FDD serving cell is configured for the terminal device, configuring the second configuration signaling for an uplink transmission frequency band and a downlink transmission frequency band of the FDD serving cell; or configuring the second configuration signaling for the FDD serving cell; and sending the second configuration signaling to the terminal device.

In some implementations, the processor 901 may further perform the following step: when at least one FDD serving cell is configured for the terminal device, determining, based on the first configuration signaling for the uplink transmission frequency band or the downlink transmission frequency band of the FDD serving cell, a symbol occupied by downlink transmission in the uplink transmission frequency band of the FDD serving cell; or determining, based on the first configuration signaling for the FDD serving cell, a symbol occupied by downlink transmission in the uplink transmission frequency band of the FDD serving cell.

In some implementations, the processor 901 may further perform the following step: when at least one FDD serving cell is configured for the terminal device, determining, based on the second configuration signaling for the uplink transmission frequency band or the downlink transmission frequency band of the FDD serving cell, a symbol occupied by downlink transmission in the uplink transmission frequency band of the FDD serving cell; or determining, based on the second configuration signaling for the FDD serving cell, a symbol occupied by downlink transmission in the uplink transmission frequency band of the FDD serving cell.

In some implementations, the processor 901 may further perform the following steps: when at least two serving cells are configured for the terminal device, configuring the first configuration signaling for M serving cells of the at least two serving cells; and sending the first configuration signaling to the terminal device, where the serving cell is an FDD serving cell or a time division duplex TDD serving cell In some implementations, the processor 901 may further perform the following steps: when at least two serving cells are configured for the terminal device, configuring the second configuration signaling for M serving cells of the at least two serving cells, where the serving cell is an FDD serving cell or a TDD serving cell; and sending the second configuration signaling to the terminal device.

In some implementations, the processor 901 may further perform the following step: when the at least two serving cells are configured for the terminal device, determining, based on the first configuration signaling for the M serving cells of the at least two serving cells, a symbol occupied by downlink transmission in an uplink subframe of each serving cell.

In some implementations, the processor 901 may further perform the following step: when the at least two serving cells are configured for the terminal device, determining, based on the second configuration signaling for the M serving cells of the at least two serving cells, a symbol occupied by downlink transmission in an uplink subframe of each serving cell.

Figure 10:
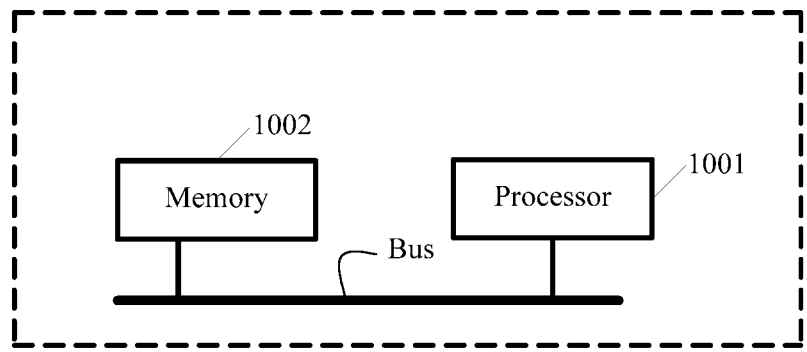
FIG. 10 is another schematic structural diagram of a terminal device according to an embodiment of the present invention.

FIG. 10 is another schematic structural diagram of a terminal device according to an embodiment of the present invention. The terminal device may include at least one processor 1001 (for example, a CPU, Central Processing Unit), at least one network interface or another communications interface, a memory 1002, and at least one communications bus that is configured to implement connection and communication between these apparatuses. The processor 1001 is configured to execute an executable module stored in the memory, for example, a computer program. The memory 1002 may include a high-speed random access memory (RAM, Random Access Memory), and may further include a non-volatile memory (non-volatile memory) such as at least one magnetic disk storage. A communication connection between a system gateway and at least one other network element is implemented by using the at least one network interface (which may be wired or wireless), and the Internet, a wide area network, a local area network, a metropolitan area network, and the like may be used.

As shown in FIG. 10, in some implementations, the memory 1002 stores a program instruction, the program instruction may be executed by the processor 1001, and the processor 1001 specifically performs the following steps: receiving first configuration signaling sent by a network-side device, where the first configuration signaling includes a resource configuration of a target subframe or an SRS configuration of the target subframe, the target subframe includes at least one SRS symbol, and the SRS symbol is used to send an SRS signal; and obtaining, based on the resource configuration of the target subframe in the first configuration signaling, the target subframe through configuration, or performing the SRS configuration of the target subframe based on the SRS configuration of the target subframe in the first configuration signaling.

In some implementations, the processor 1001 may further perform the following step: the SRS configuration of the target subframe includes cell-specific SRS configuration information or user-specific SRS configuration information, the cell-specific SRS configuration information is used to identify the SRS symbol in the target subframe, and the user-specific SRS configuration information is used to identify an SRS resource that is allocated to the terminal device and that is in the SRS symbol in the target subframe, where the SRS resource includes a time domain resource, a frequency domain resource, or a code domain resource, the time domain resource includes one or more SRS symbols, and the code domain resource includes one or more SRS sequences; and determining the SRS symbol in the target subframe based on the cell-specific SRS configuration information; or determining, based on the user-specific SRS configuration information, an SRS resource that is allocated to the terminal device and that is in the SRS symbol in the target subframe.

In some implementations, the processor 1001 may further perform the following steps: receiving second configuration signaling sent by the network-side device, where the second configuration signaling includes a shared channel indication or a first symbol indication, the shared channel indication is used to indicate a symbol occupied by a shared channel in the target subframe, and the first symbol indication is used to indicate a symbol available for SRS transmission, so that the terminal device determines, according to the first symbol indication, the symbol occupied by the shared channel in the target subframe; and determining, according to the shared channel indication or the first symbol indication, the symbol occupied by the shared channel in the target subframe.

In some implementations, the processor 1001 may further perform the following step: receiving downlink control information DCI sent by the network-side device, where the DCI carries the second configuration signaling.

In some implementations, the processor 1001 may further perform the following step: determining, based on the symbol occupied by the shared channel, a symbol occupied by a demodulation reference signal DMRS in the target subframe, and sending or receiving the DMRS based on the symbol occupied by the DMRS.

In some implementations, the processor 1001 may further perform the following steps: when at least one frequency division duplex FDD serving cell is configured for the terminal device, receiving first configuration signaling that is for an uplink transmission frequency band and a downlink transmission frequency band of the FDD serving cell and that is sent by the network-side device; or receiving first configuration signaling that is for the FDD serving cell and that is sent by the network-side device; and determining, based on the first configuration signaling for the uplink transmission frequency band and the downlink transmission frequency band of the FDD serving cell, a shared channel symbol location or a DMRS symbol location of the FDD serving cell; or determining, based on the first configuration signaling for the FDD serving cell, a shared channel symbol location or a DMRS symbol location of the FDD serving cell.

In some implementations, the processor 1001 may further perform the following steps: when at least one FDD serving cell is configured for the terminal device, receiving second configuration signaling that is for an uplink transmission frequency band and a downlink transmission frequency band of the FDD serving cell and that is sent by the network-side device; or receiving second configuration signaling that is for the FDD serving cell and that is sent by the network-side device; and determining, based on the second configuration signaling for the uplink transmission frequency band and the downlink transmission frequency band of the FDD serving cell, a shared channel symbol location or a DMRS symbol location of the FDD serving cell; or determining, based on the second configuration signaling for the FDD serving cell, a shared channel symbol location or a DMRS symbol location of the FDD serving cell.

In some implementations, the processor 1001 may further perform the following step: when the at least one FDD serving cell is configured for the terminal device, determining, based on the first configuration signaling for the uplink transmission frequency band or the downlink transmission frequency band of the FDD serving cell, a symbol occupied by downlink transmission in the uplink transmission frequency band of the FDD serving cell; or determining, based on the first configuration signaling for the FDD serving cell, a symbol occupied by downlink transmission in the uplink transmission frequency band of the FDD serving cell.

In some implementations, the processor 1001 may further perform the following step: when the at least one FDD serving cell is configured for the terminal device, determining, based on the second configuration signaling for the uplink transmission frequency band or the downlink transmission frequency band of the FDD serving cell, a symbol occupied by downlink transmission in the uplink transmission frequency band of the FDD serving cell; or determining, based on the second configuration signaling for the FDD serving cell, a symbol occupied by downlink transmission in the uplink transmission frequency band of the FDD serving cell.

In some implementations, the processor 1001 may further perform the following steps: when at least two serving cells are configured for the terminal device, receiving the first configuration signaling that is for M serving cells of the at least two serving cells and that is sent by the network-side device; and determining a shared channel symbol location or a DMRS symbol location based on the first configuration signaling for the M serving cells of the at least two serving cells.

In some implementations, the processor 1001 may further perform the following steps: when at least two serving cells are configured for the terminal device, receiving the second configuration signaling that is for M serving cells of the at least two serving cells and that is sent by the network-side device; and determining a shared channel symbol location or a DMRS symbol location based on the second configuration signaling for the M serving cells of the at least two serving cells.

In some implementations, the processor 1001 may further perform the following step: when the at least two serving cells are configured for the terminal device, determining, based on the first configuration signaling corresponding to the M serving cells of the at least two serving cells, a symbol occupied by downlink transmission in an uplink subframe of each serving cell.

In some implementations, the processor 1001 may further perform the following step: when the at least two serving cells are configured for the terminal device, determining, based on the second configuration signaling corresponding to the serving cells, a symbol occupied by downlink transmission in an uplink subframe of each serving cell.

In the foregoing embodiments, the description of each embodiment has respective focuses. For a part that is not described in detail in an embodiment, refer to related descriptions in other embodiments.

It may be clearly learned by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of the present invention essentially, or the part contributing to the prior art, or all or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The subframe configuration method and the related device provided in the embodiments of the present invention are described in detail above. A person of ordinary skill in the art can make variations to the present invention in terms of the specific implementations and application scopes based on the ideas of the embodiments of the present invention. To sum up, content of the specification should not be understood as a limitation on the embodiments of the present invention.

What is claimed is:

1. A subframe configuration method, comprising:
configuring, by a network-side device, a target subframe, wherein the target subframe comprises at least one sounding reference signal (SRS) symbol used to send an SRS signal; and
sending, by the network-side device, first configuration signaling to a terminal device, wherein the first configuration signaling comprises a resource configuration of the target subframe or an SRS configuration of the target subframe, wherein the SRS configuration of the target subframe comprises cell-specific SRS configuration information or user-specific SRS configuration information, wherein the cell-specific SRS configuration information is used to identify the SRS symbol in the target subframe, wherein the user-specific SRS configuration information is used to identify an SRS resource that is allocated to the terminal device and that is in the SRS symbol in the target subframe, wherein the SRS resource comprises a time domain resource, a frequency domain resource, or a code domain resource, wherein the time domain resource comprises one or more SRS symbols, and wherein the code domain resource comprises one or more SRS sequences.

2. The method according to claim 1, wherein after the sending, by the network-side device, first configuration signaling to a terminal device, the method further comprises:
sending, by the network-side device, second configuration signaling to the terminal device, wherein the second configuration signaling comprises a shared channel indication or a first symbol indication, wherein the shared channel indication is used to indicate a symbol occupied by a shared channel in the target subframe, wherein the first symbol indication is used to indicate a symbol available for SRS transmission, and wherein the terminal device determines, according to the first symbol indication, the symbol occupied by the shared channel in the target subframe.

3. The method according to claim 2, wherein the sending, by the network-side device, second configuration signaling to the terminal device comprises:
sending, by the network-side device, downlink control information (DCI) to the terminal device, wherein the DCI carries the second configuration signaling.

4. The method according to claim 3, wherein the method further comprises:
determining, by the network-side device based on the symbol occupied by the shared channel in the target subframe, a symbol occupied by a demodulation reference signal (DMRS) in the target subframe; and
sending or receiving, by the network-side device, the DMRS based on the symbol occupied by the DMRS.

5. The method according to claim 3, wherein the sending, by the network-side device, first configuration signaling to a terminal device comprises:
when at least one frequency division duplex (FDD) serving cell is configured for the terminal device:
configuring, by the network-side device, the first configuration signaling for an uplink transmission frequency band and a downlink transmission frequency band of the FDD serving cell, and sending the first configuration signaling to the terminal device; or
configuring, by the network-side device, the first configuration signaling for the FDD serving cell, and sending the first configuration signaling to the terminal device.

6. A network-side device, comprising:
at least one processor, the at least one processor configured to configure a target subframe, wherein the target subframe comprises at least one sounding reference signal (SRS) symbol used to send an SRS signal; and
a transceiver, the transceiver configured to send first configuration signaling to a terminal device, wherein the first configuration signaling comprises a resource configuration of the target subframe or an SRS configuration of the target subframe, wherein the SRS configuration of the target subframe comprises cell-specific SRS configuration information or user-specific SRS configuration information, wherein the cell-specific SRS configuration information is used to identify the SRS symbol in the target subframe, wherein the user-specific SRS configuration information is used to identify an SRS resource that is allocated to the terminal device and that is in the SRS symbol in the target subframe, wherein the SRS resource comprises a time domain resource, a frequency domain resource, or a code domain resource, wherein the time domain resource comprises one or more SRS symbols, and wherein the code domain resource comprises one or more SRS sequences.

7. The network-side device according to claim 6, wherein the transceiver is further configured to:
after sending the first configuration signaling to the terminal device, send second configuration signaling to the terminal device, wherein the second configuration signaling comprises a shared channel indication or a first symbol indication, wherein the shared channel indication is used to indicate a symbol occupied by a shared channel in the target subframe, wherein the first symbol indication is used to indicate a symbol available for SRS transmission, and wherein the terminal device determines, according to the first symbol indication, the symbol occupied by the shared channel in the target subframe.

8. The network-side device according to claim 7, wherein the transceiver is configured to send downlink control information (DCI) to the terminal device, wherein the DCI carries the second configuration signaling.

9. The network-side device according to claim 8, wherein the at least one processor is further configured to:
determine, based on the symbol occupied by the shared channel in the target subframe, a symbol occupied by a demodulation reference signal (DMRS) in the target subframe; and
send or receive the DMRS based on the symbol occupied by the DMRS.

10. The network-side device according to claim 8, wherein:
the at least one processor is configured to:
when at least one frequency division duplex (FDD) serving cell is configured for the terminal device:
configure the first configuration signaling for an uplink transmission frequency band and a downlink transmission frequency band of the FDD serving cell; or
configure the first configuration signaling for the FDD serving cell; and
the transceiver is further configured to send the first configuration signaling to the terminal device.

11. A terminal device, comprising:
a transceiver, the transceiver configured to receive first configuration signaling sent by a network-side device, wherein the first configuration signaling comprises a resource configuration of a target subframe or a sounding reference signal (SRS) configuration of the target subframe, wherein the target subframe comprises at least one SRS symbol, wherein the SRS symbol is used to send an SRS signal, wherein the SRS configuration of the target subframe comprises cell-specific SRS configuration information or user-specific SRS configuration information, wherein the cell-specific SRS configuration information is used to identify the SRS symbol in the target subframe, wherein the user-specific SRS configuration information is used to identify an SRS resource that is allocated to the terminal device and that is in the SRS symbol in the target subframe, wherein the SRS resource comprises a time domain resource, a frequency domain resource, or a code domain resource, wherein the time domain resource comprises one or more SRS symbols, and wherein the code domain resource comprises one or more SRS sequences; and
at least one processor, the at least one processor configured to:
determine the SRS symbol in the target subframe based on the cell-specific SRS configuration information, or determine, based on the user-specific SRS configuration information, the SRS resource that is allocated to the terminal device and that is in the SRS symbol in the target subframe; and
obtain, based on the resource configuration of the target subframe in the first configuration signaling, the target subframe through configuration; or
perform the SRS configuration of the target subframe based on the SRS configuration of the target subframe in the first configuration signaling.

12. The terminal device according to claim 11, wherein:
the transceiver is further configured to receive second configuration signaling sent by the network-side device, wherein the second configuration signaling comprises a shared channel indication or a first symbol indication, wherein the shared channel indication is used to indicate a symbol occupied by a shared channel in the target subframe, wherein the first symbol indication is used to indicate a symbol available for SRS transmission, and wherein the terminal device determines, according to the first symbol indication, the symbol occupied by the shared channel in the target subframe; and the at least one processor is further configured to determine, according to the shared channel indication or the first symbol indication, the symbol occupied by the shared channel in the target subframe.

13. The terminal device according to claim 12, wherein the transceiver is configured to receive downlink control information (DCI) sent by the network-side device, and wherein the DCI carries the second configuration signaling.

14. The terminal device according to claim 13, wherein the at least one processor is further configured to:
 determine, based on the symbol occupied by the shared channel, a symbol occupied by a demodulation reference signal (DMRS) in the target subframe; and
 send or receive the DMRS based on the symbol occupied by the DMRS.

15. The terminal device according to claim 13, wherein:
 the transceiver is configured to:
  when at least one frequency division duplex (FDD) serving cell is configured for the terminal device, receive the first configuration signaling that is for an uplink transmission frequency band and a downlink transmission frequency band of the FDD serving cell and that is sent by the network-side device; or
  receive the first configuration signaling that is for the FDD serving cell and that is sent by the network-side device; and
 the at least one processor is configured to:
  determine, based on the first configuration signaling for the uplink transmission frequency band and the downlink transmission frequency band of the FDD serving cell, a shared channel symbol location or a DMRS symbol location of the FDD serving cell; or
  determine, based on the first configuration signaling for the FDD serving cell, a shared channel symbol location or a DMRS symbol location of the FDD serving cell.

* * * * *